(12) United States Patent
Furukawa

(10) Patent No.: US 11,390,316 B2
(45) Date of Patent: Jul. 19, 2022

(54) CONTROL DEVICE FOR AC ROTARY MACHINE AND CONTROL DEVICE FOR ELECTRIC POWER STEERING

(71) Applicant: Mitsubishi Electric Corporation, Tokyo (JP)

(72) Inventor: Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 357 days.

(21) Appl. No.: 16/627,933

(22) PCT Filed: Jul. 31, 2017

(86) PCT No.: PCT/JP2017/027756
§ 371 (c)(1),
(2) Date: Dec. 31, 2019

(87) PCT Pub. No.: WO2019/026145
PCT Pub. Date: Feb. 7, 2019

(65) Prior Publication Data
US 2021/0146991 A1 May 20, 2021

(51) Int. Cl.
*H02P 23/00* (2016.01)
*H02P 25/00* (2006.01)
(Continued)

(52) U.S. Cl.
CPC .............. *B62D 5/046* (2013.01); *H02P 21/05* (2013.01); *H02P 21/22* (2016.02); *H02P 23/04* (2013.01); *H02P 27/08* (2013.01)

(58) Field of Classification Search
CPC ......... B62D 5/046; H02P 21/22; H02P 21/05; H02P 23/04
(Continued)

(56) References Cited

U.S. PATENT DOCUMENTS

| 2010/0201294 | A1* | 8/2010 | Yuuki | B60L 50/51 |
| | | | | 318/400.3 |
| 2018/0183369 | A1* | 6/2018 | Kanazawa | B62D 5/046 |
| 2020/0106378 | A1* | 4/2020 | Xu | H02P 21/141 |

FOREIGN PATENT DOCUMENTS

| JP | 2008-273478 A | 11/2008 |
| JP | 2017-017860 A | 1/2017 |
| WO | 2016/117115 A1 | 7/2016 |

OTHER PUBLICATIONS

International Search Report for PCT/JP2017/027756 dated Oct. 31, 2017 [PCT/ISA/210].

* cited by examiner

Primary Examiner — Erick D Glass
(74) Attorney, Agent, or Firm — Sughrue Mion, PLLC; Richard C. Turner

(57) ABSTRACT

A control device for an AC rotary machine includes: a DC power supply; an inverter; a magnetic flux generator; an angle detector; and a control arithmetic unit; wherein the control arithmetic unit is configured to: calculate, based on a positional relationship between a current path and the angle detector, a correction signal for correcting signal errors of a cosine signal and a sine signal, which are caused by a noise magnetic flux component due to at least one of a DC current flowing between the DC power supply and the inverter and multi-phase AC currents flowing between the inverter and armature windings; and control the inverter by using angle information obtained from values after the correction by the correction signal.

12 Claims, 12 Drawing Sheets

(51) Int. Cl.
*H02P 27/00* (2006.01)
*B62D 5/04* (2006.01)
*H02P 21/22* (2016.01)
*H02P 21/05* (2006.01)
*H02P 23/04* (2006.01)
*H02P 27/08* (2006.01)

(58) Field of Classification Search
USPC .......................................................... 180/446
See application file for complete search history.

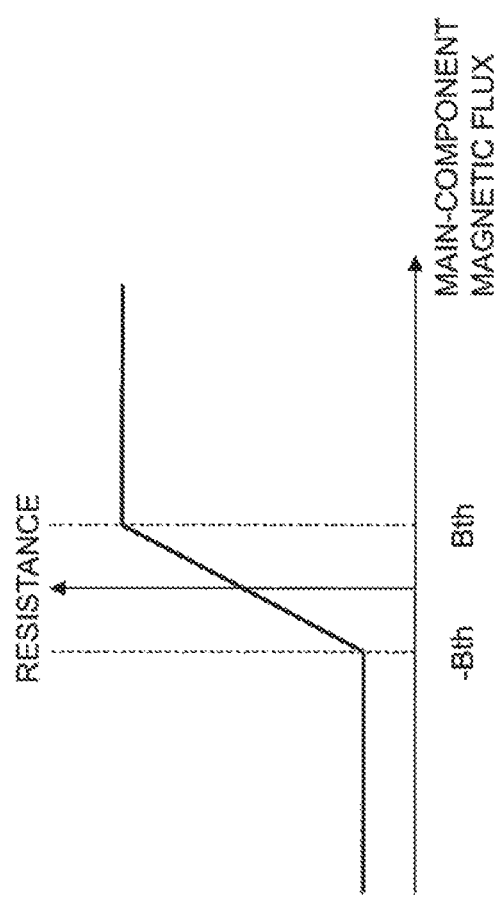

CONTROL DEVICE FOR AC ROTARY MACHINE AND CONTROL DEVICE FOR ELECTRIC POWER STEERING

CROSS REFERENCE TO RELATED APPLICATIONS

This application is a National Stage of International Application No. PCT/JP2017/027756, filed on Jul. 31, 2017.

TECHNICAL FIELD

The present invention relates to a control device for an AC rotary machine for increasing a detection accuracy of a rotation angle, and a control device for an electric power steering.

BACKGROUND ART

An increase in a detection accuracy of a rotation position of a rotor is required for providing an AC rotary machine having a reduced torque ripple. A related-art motor drive device is provided with a magnetic flux error correction unit configured to detect or calculate a magnetic flux component caused by a DC current and an AC current flowing through main circuit lines. Influence of a disturbance magnetic flux vector can be removed from position information by installing the magnetic flux error correction unit (for example, see Patent Literature 1).

CITATION LIST

Patent Literature

[PTL 1] JP 2008-273478 A
[PTL 2] JP 2017-17860 A

SUMMARY OF INVENTION

Technical Problem

However, the related art has the following problem.

With employment of the method described in Patent Literature 1, it is possible to reduce an angle error of rotation 1st order caused by an offset error contained in a sine signal and a cosine signal, or an angle error of 2nd order rotation caused by an amplitude ratio. However, with employment of the method described in Patent Literature 1, it is not possible to reduce an angle error caused by a signal error, which is due to a disturbance magnetic flux caused by a DC current or an AC current.

To address such a problem, there is given a related art involving calculating a disturbance magnetic flux vector Bd caused by the DC current or the AC current, and subtracting the disturbance magnetic flux vector Bd from a detected vector Bc obtained by a magnetic sensor (for example, see Patent Literature 2).

A magnet magnetic flux vector Bs can be obtained by a magnetic sensor configured to detect a magnetic flux vector itself. FIG. 12 is a diagram for illustrating a relationship between a main-component magnetic flux and a resistance in a magnetic sensor employing a magnetoresistive element. As illustrated in FIG. 12, the resistance changes within a range in which the main-component magnetic flux takes the value of from −Bth to Bth. Therefore, a fluctuation of a detection signal by the magnetic sensor is large, and an accuracy of a detected angle consequently decreases.

Meanwhile, within ranges in which the main-component magnetic flux takes a value equal to or smaller than −Bth or equal to or larger than Bth, the resistance is substantially constant. Thus, the fluctuation of the detection signal can be suppressed within those ranges, and the accuracy of the detected angle is excellent. Thus, the magnetic sensor is often used within the ranges in which the resistance hardly changes with respect to the main-component magnetic flux, that is, within the ranges in a saturated state with respect to the main component direction of the magnet magnetic flux vector, in order to secure the accuracy of the detected angle.

A consideration is now given of a case in which such a magnetic sensor is used, and a disturbance magnetic flux vector of 0th order rotation is caused by a DC current. In this case, the magnetic sensor is in the saturated state in the main component direction, and a component perpendicular to the main component direction is superimposed on the detection signal as an error component. Noise components contained in the detection signal are components of 0th order rotation and 2nd order rotation in this state. Therefore, even when the detection signal is corrected in accordance with the component of the disturbance magnetic flux vector, the noise component of 2nd order rotation cannot be removed.

Moreover, a consideration is given of a case in which the number of pole pairs of the AC rotary machine is five, and a disturbance magnetic flux vector of rotation fifth order is caused by multi-phase AC currents. In this case, the magnetic sensor is in the saturated state in the main component direction, and a component perpendicular to the main component direction is superimposed on the detection signal as an error component. Noise components contained in the detection signal are components of 3rd order rotation, 5th order rotation, and 7th order rotation in this state. Therefore, even when the detection signal is corrected in accordance with the component of the disturbance magnetic flux vector, the noise components of 3rd order rotation and 7th order rotation cannot be removed.

In other words, when the magnetic sensor is used in the saturated state with respect to the main-component direction of the magnet magnetic flux vector, the noise components caused by the disturbance magnetic flux, and contained in the detected vector are different from those of Bd in order. Therefore, there is such a problem that even when the correction is made with the focus on the disturbance magnetic flux, the influence of the disturbance magnetic flux vector cannot be removed from the positional information.

The present invention has been made in view of the above-mentioned problem, and therefore has an object to provide a control device for an AC rotary machine for increasing the detection accuracy of the rotation angle, and a control device for electric power steering.

Solution to Problem

According to at least one embodiment of the present invention, there is provided a control device for an AC rotary machine including: a DC power supply; an inverter configured to invert a DC voltage supplied from the DC power supply to AC voltages, and apply the AC voltages to armature windings of the AC rotary machine; a magnetic flux generator configured to rotate in synchronization with a rotor of the AC rotary machine configured to be rotated by a rotating magnetic flux formed by multi-phase AC currents flowing through the armature windings, to thereby generate an angle detection magnetic flux for detecting a rotation angle of the AC rotary machine; an angle detector, which is used in a saturated state with respect to a main component direction of the angle detection magnetic flux, and is configured to detect a cosine signal and a sine signal, which are two components orthogonal to each other and form the angle detection magnetic flux; and a control arithmetic unit configured to control the inverter based on a current command directed to the AC rotary machine and angle information obtained from the cosine signal and the sine signal; wherein the control arithmetic unit is configured to: calculate, based on a positional relationship between a current path and the angle detector, a correction signal for correcting signal errors of the cosine signal and the sine signal, which are caused by a noise magnetic flux component due to at least one of a DC current flowing between the DC power supply and the inverter or the multi-phase AC currents flowing between the inverter and the armature windings; and control the inverter by using the angle information obtained from a corrected cosine signal and a corrected sine signal, which are values after the correction by the correction signal Further, according to at least one embodiment of the present invention, there is provided a control device for electric power steering including the control device for an AC rotary machine of at least one embodiment of the present invention, wherein the control device for an AC rotary machine is configured to execute torque control of generating a torque for assisting a steering torque of electric power steering.

Advantageous Effects of Invention

With at least one embodiment of the present invention, there is provided the configuration of calculating, when the angle detector configured to detect the magnetic flux component in the saturated state with respect to the main component direction of the angle detection magnetic flux is used, the correction signal based on the noise magnetic flux of the normal line direction component of the main magnetic flux caused by at least one of the DC current or the multi-phase AC currents, to thereby correct the sine signal and the cosine signal, which are the magnetic flux components acquired by the angle detector. As a result, it is possible to obtain an unprecedented outstanding effect of being able to obtain the control device for an AC rotary machine and the control device for electric power steering, which increase the detection accuracy of the rotation angle.

BRIEF DESCRIPTION OF DRAWINGS

FIG. 12 is a diagram for illustrating a relationship between a main component magnetic flux and a resistance in a magnetic sensor employing a magnetoresistive element.

DESCRIPTION OF EMBODIMENTS

A description is now given of a control device for an AC rotary machine and a control device for electric power steering according to exemplary embodiments of the present invention with reference to the drawings.

First Embodiment

Figure 1:
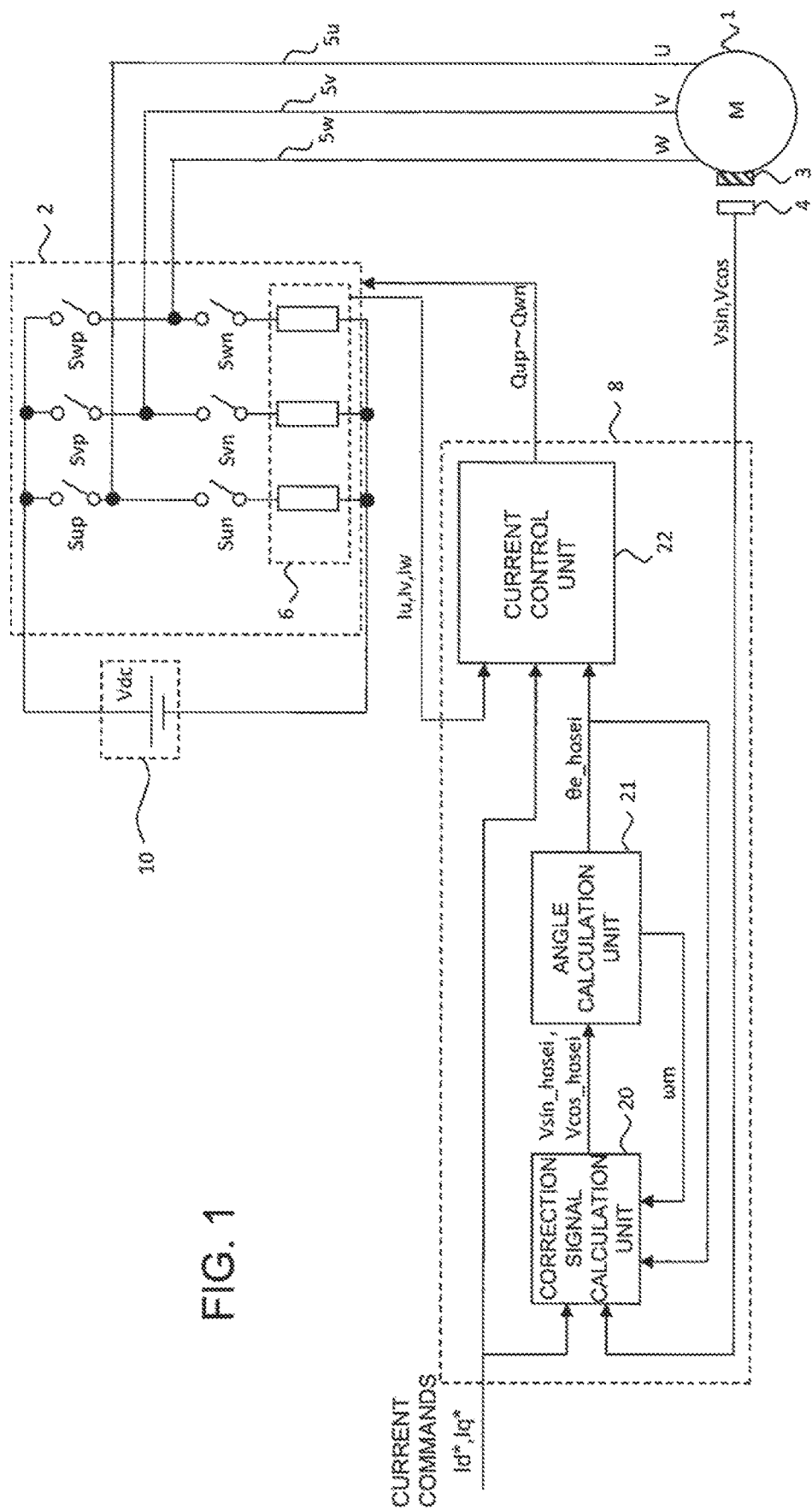
FIG. 1 is a diagram for illustrating an overall configuration of a control device for an AC rotary machine according to a first embodiment of the present invention.

FIG. 1 is a diagram for illustrating an overall configuration of a control device for an AC rotary machine according to a first embodiment of the present invention. The AC rotary machine 1 is a permanent magnet type synchronous rotary machine including three-phase windings U, V, and W. The AC rotary machine 1 is configured to include a rotor and a stator.

A description is given of the case in which the AC rotary machine 1 is a permanent magnet type synchronous rotary machine, but the AC rotary machine 1 may be a field winding type synchronous rotary machine. Moreover, a description is given of the AC rotary machine 1 including three-phase windings, but the AC rotary machine 1 may include wingdings in three or more phases.

The number of electric cycles with respect to one cycle of the rotor changes depending on the number of pole pairs of the stator or rotor of the AC rotary machine 1. For example, in the AC rotary machine 1 having two pole pairs, two cycles electrically advance during one cycle of the rotor.

The rotation angle of the rotor is referred to as "mechanical angle". The phase of the electrical cycle is referred to as "electrical angle". The electrical angle $\theta e$ is obtained by multiplying the mechanical angle $\theta m$ by the number of pole pairs P as given by Expression (1).

$$\theta_e = P\theta_m \tag{1}$$

A DC power supply 10 is configured to output a DC voltage Vdc to the inverter 2. The DC power supply includes all devices configured to output a DC voltage such as a battery, a DC-DC converter, a diode rectifier, and a PWM rectifier.

The inverter 2 is configured to turn on/off semiconductor switches Sup to Swn based on switching signals Qup to Qwn output from the control arithmetic unit 8. As a result, the inverter 2 applies power conversion to the DC voltage Vdc input from the DC power supply 10, and applies AC voltages to the three-phase windings U, V, and W of the AC rotary machine 1 through an inverter connection unit 5.

As each of the semiconductor switches Sup to Swn, a diode and a semiconductor switch such as an IGBT, a bipolar transistor, or a MOS power transistor, which are connected to each other in antiparallel, are used.

The switching signals Qup, Qun, Qvp, Qvn, Qwp, and Qwn are switching signals for switching on/off the respective semiconductor switches Sup, Sun, Svp, Svn, Swp, and Swn in the inverter 2 in this state.

The current detector 6 is inserted between the lower arms of the inverter 2 and the ground of the DC power supply 10, and is configured to detect currents flowing in the three phases. The current detector 6 illustrated in FIG. 1 is configured to detect the three phases, but the current detector 6 is not limited to such a configuration. As the current detector, a current detector configured to detect two phases may be employed, and the remaining one phase may be calculated based on a fact that a sum of the currents in the three phases is zero.

Moreover, there may be employed a current detector configured to appropriately set switching timings of the inverter 2 and a timing for the current detection, to thereby detect the current as a bus current. The current detector 6 illustrated in FIG. 1 detects the three-phase currents, and thus outputs a U-phase current iu, a V-phase current iv, and a W-phase current iw.

The AC rotary machine 1 and the inverter 2 are connected to each other by the inverter connection unit 5. The inverter connection unit 5 includes an inverter connection unit 5u configured to cause the U-phase current to flow, an inverter connection unit 5v configured to cause the V-phase current to flow, and an inverter connection unit 5w configured to cause the W-phase current to flow. The voltages output from the inverter 2 are applied to the windings in the respective phases of the AC rotary machine 1 through the inverter connection units 5u, 5v, and 5w to cause desired currents to flow through the AC rotary machine 1, to thereby generate a torque.

The magnetic flux generator 3 rotates in synchronization with the rotor of the AC rotary machine 1, and, for example, it is preferred to use a permanent magnet.

The angle detector 4 is arranged at a position coaxial with and corresponding to the magnetic flux generator 3. Then, the angle detector 4 is configured to detect a magnetic flux caused by the magnetic flux generator 3, and output a sine signal V sin and a cosine signal V cos in accordance with components of the magnetic flux. In order to suppress fluctuation of a fundamental wave amplitude ratio between the sine signal V sin and the cosine signal V cos, it is assumed that the angle detector 4 is used in a saturated state with respect to the main component magnetic flux of the magnetic flux generator 3.

The magnetic flux generator 3 also has the concept of the number of pole pairs similarly to the AC rotary machine 1. Thus, the angle detector 4 outputs the sine signal V sin and the cosine signal V cos at a shaft angle multiplier equal to the number of pole pairs of the magnetic flux generator 3. A relationship between a rotation angle θsm of the magnetic flux generator 3 and an angle θsns obtained from the sine signal V sin and the cosine signal V cos output from the angle detector 4 is given by Expression (2) where Psns represents the shaft angle multiplier of the angle detector 4.

$$\theta_{sns} = P_{sns}\theta_{sm} \quad (2)$$

The rotor of the AC rotary machine 1 and the magnetic flux generator 3 rotate in synchronization with each other. With this configuration, Expression (3) is satisfied between the mechanical angle θm and the rotation angle θsm of the magnetic flux generator 3.

$$\theta_m = \theta_{sm} \quad (3)$$

A description is given based on the assumption that the zero point of the mechanical angle θm and the zero point of the rotation angle θsm of the magnetic flux generator 3 match each other, but when the zero points are displaced from each other, it is only required to provide an offset corresponding to the displacement. Thus, the electrical angle θe of the AC rotary machine 1 can be expressed by the angle θsns obtained from the sine signal Visn and the cosine signal V cos output from the angle detector 4 as given by Expression (4).

$$\begin{cases} \theta_e = K_p \theta_{sns} \\ K_p = \dfrac{P}{P_{sns}} \end{cases} \quad (4)$$

In other words, the electrical angle θe of the AC rotary machine 1 can be obtained by multiplying the angle θsns by a ratio of the number of pole pairs of the AC rotary machine 1 to the shaft angle multiplier of the angle detector 4.

The control arithmetic unit 8 is configured to output the switching signals Qup to Qwn based on the sine signal V sin and the cosine signal V cos obtained from the angle detector 4, the three phase currents Iu, Iv, and Iw obtained from the current detector 6, and the current commands Id* and Iq*.

Specifically, the correction signal calculation unit 20 in the control arithmetic unit 8 is configured to use a method described later so as to correct signal errors of the sine signal V sin and the cosine signal V cos output from the angle detector 4, which are caused by the noise magnetic flux components due to the DC current flowing between the DC power supply 10 and the inverter 2 and the multi-phase AC currents flowing between the inverter 2 and the armature windings of the AC rotary machine 1, respectively. Then, the correction signal calculation unit 20 is configured to output a corrected sine signal V sin_hosei and a corrected cosine signal V cos_hosei, the signal errors of which have been corrected.

An angle calculation unit 21 is configured to calculate a corrected rotation angle based on the corrected sine signal V sin_hosei and the corrected cosine signal V cos_hosei. The corrected rotation angle output by the angle calculation unit 21 is to be used by the current control unit 22, and it is preferred to convert the corrected rotation angle to an electrical angle equivalent value. In this configuration, the angle calculation unit 21 is configured to output a corrected electrical angle θe_hosei.

Moreover, the angle calculation unit 21 is configured to calculate the number of rotations cam of the rotor of the AC rotary machine from a change amount of the corrected rotation angle.

The current control unit 22 is configured to apply coordinate conversion to the three-phase currents Iu, Iv, and Iw obtained from the current detector 6 in accordance with the electrical angle θe-hosei obtained from the angle calculation unit 21, to thereby acquire detected currents Id and Iq. Further, a current control unit 22 is configured to calculate voltage commands Vu, Vv, and Vw by means of current feedback control based on deviations between the current command Id* and Iq* and the detected currents Id and Iq so that the deviations are zero.

The current control unit 22 is configured to execute the pulse width modulation (PWM modulation) based on the voltage commands Vu, Vv, and Vw, to thereby output the switching signals Qup to Qwn having pulse widths corresponding to the voltage commands Vu, Vv, and Vw.

The current control unit 22 may be configured to execute feedforward control in accordance with specifications of the AC rotary machine 1, to thereby calculate the voltage commands Vu, Vv, and Vw. Thus, the input of the three-phase currents Iu, Iv, and Iw to the current control unit 22 is not required.

Figure 2:
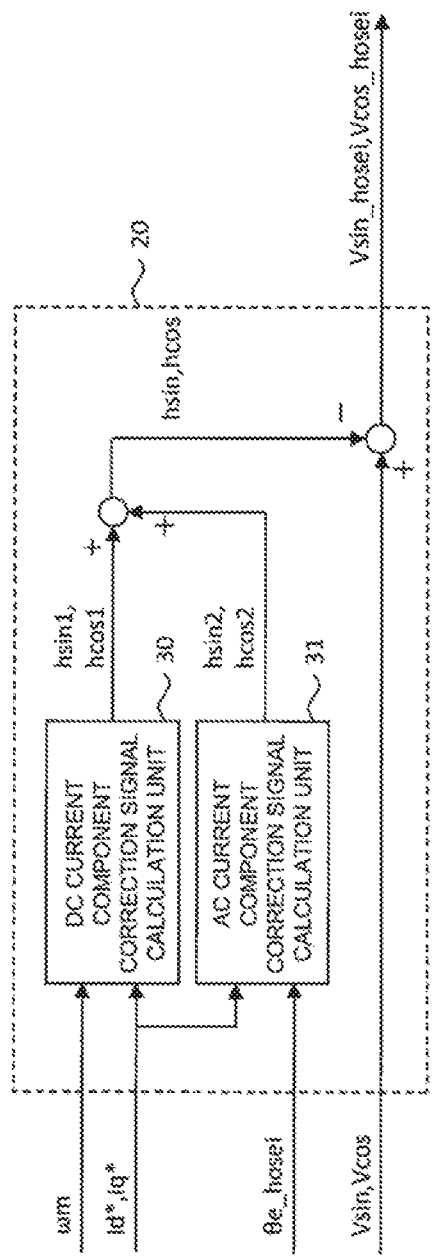
FIG. 2 is a block diagram for illustrating a configuration of a correction signal calculation unit in the first embodiment of the present invention.

FIG. 2 is a block diagram for illustrating a configuration of the correction signal calculation unit 20 according to the first embodiment of the present invention. A DC current correction signal calculation unit 30 is configured to calculate DC current component correction signals h sin1 and h cos1 for correcting the signal errors caused by the noise magnetic flux component due to the DC current flowing between the DC power supply 10 and the inverter 2.

In the first embodiment, a DC bus current Idc cannot be detected by the current detector 6. Therefore, the DC current correction signal calculation unit 30 is configured to use, for example, an AC resistance Ra, a DC resistance Rdc, a magnetic flux 9, and the power supply voltage Vdc so as to calculate the DC bus current Idc given by Expression (5).

$$\begin{cases} I_{dc} = \dfrac{V_{dc} - \sqrt{V_{dc}^2 - 4R_{dc}P_w}}{2R_{dc}} \\ P_w = R_a(I_d^{*2} + I_q^{*2}) + P\phi I_q \omega_m \end{cases} \quad (5)$$

An AC current correction signal calculation unit 31 is configured to calculate AC current component correction signals h sin2 and h cos2 for correcting the signal errors caused by the noise magnetic flux component due to the multi-phase AC currents flowing between the inverter 2 and the armature windings of the AC rotary machine 1. The AC current correction signal calculation unit 31 illustrated in FIG. 2 is configured to use the current commands Id* and Iq*, but may use the detected currents Id and Iq.

Moreover, the AC current correction signal calculation unit 31 illustrated in FIG. 2 uses θe_hosei obtained by the angle calculation unit 21, but may use an angle obtained by applying advance correction to a previous value of θe_hosei, an angle calculated from the sine signal V sin and the cosine signal V cos without correction, and the like.

Correction signals h sin and h cos are calculated from the DC current component correction signals h sin1 and h cos1 and the AC current component correction signals h sin2 and h cos2 based on Expression (6).

$$\begin{pmatrix} h\sin \\ h\cos \end{pmatrix} = \begin{pmatrix} h\sin1 + h\sin2 \\ h\cos1 + h\cos2 \end{pmatrix} \quad (6)$$

Moreover, the corrected cosine signal V cos_hosei and the corrected sine signal V sin_hosei are calculated from the sine signal V sin and the cosine signal V cos and the correction signals h sin and h cos based on Expression (7).

$$\begin{pmatrix} V\sin\_hosei \\ V\cos\_hosei \end{pmatrix} = \begin{pmatrix} V\sin - h\sin \\ V\cos - h\cos \end{pmatrix} \quad (7)$$

As the method of calculating the DC bus current Idc, Expression (8) that uses an ON time ratio Du of the semiconductor switch Sup, an ON time ratio Dv of the semiconductor switch Svp, and an ON time ratio Dw of the semiconductor switch Swp may be employed.

$$I_{dc} = I_u D_u + I_v D_v + I_w D_w \quad (8)$$

Moreover, the method of calculating the DC bus current Idc is not limited to Expression (5) or Expression (8). Moreover, the parameters used for the calculation are not limited to the number of rotations, the current commands, and the detected currents.

A description is now given of a calculation method for the signal errors caused by the noise magnetic flux components due to the DC current and the multi-phase AC currents, and the correction signals for correcting those signal errors. For the sake of description, it is assumed that the number of pole pairs of the AC rotary machine 1 is 5, the shaft angle multiplier of the angle detector 4 is 1, and an X-axis direction of the angle detector 4 and a direction (zero point position) of 0 deg of the mechanical angle of the AC rotary machine 1 match each other. The same applies to a case in which the number of pole pairs, the shaft angle multiplier, and the zero point position are different.

When the noise magnetic flux does not exist, a magnetic flux density at the angle detector 4:

$$\vec{B}_{ideal}$$

is given by Expression (9) using the mechanical angle θm of the magnetic flux generator 3.

$$\vec{B}_{ideal} = \begin{pmatrix} \cos\theta_m \\ \sin\theta_m \end{pmatrix} \quad (9)$$

Expression (9) is expressed as a standardized expression, but the same description can be applied to a case in which the fundamental wave amplitude is not 1.

In contrast, when the noise magnetic flux components caused by the DC current and the multi-phase AC currents are superimposed, the magnetic flux density at the angle detector 4:

$$\vec{B}$$

is given by Expression (10).

$$\vec{B} = \vec{B}_{ideal} + \vec{B}_i = \quad (10)$$

$$\begin{pmatrix} \cos\theta_m \\ \sin\theta_m \end{pmatrix} + \begin{pmatrix} B_{a0} + B_{a5}\cos(5\theta_m + \theta_y) + B_{b5}\sin(5\theta_m + \theta_y) \\ B_{c0} + B_{c5}\cos(5\theta_m + \theta_y) + B_{d5}\sin(5\theta_m + \theta_y) \end{pmatrix}$$

Figure 3:
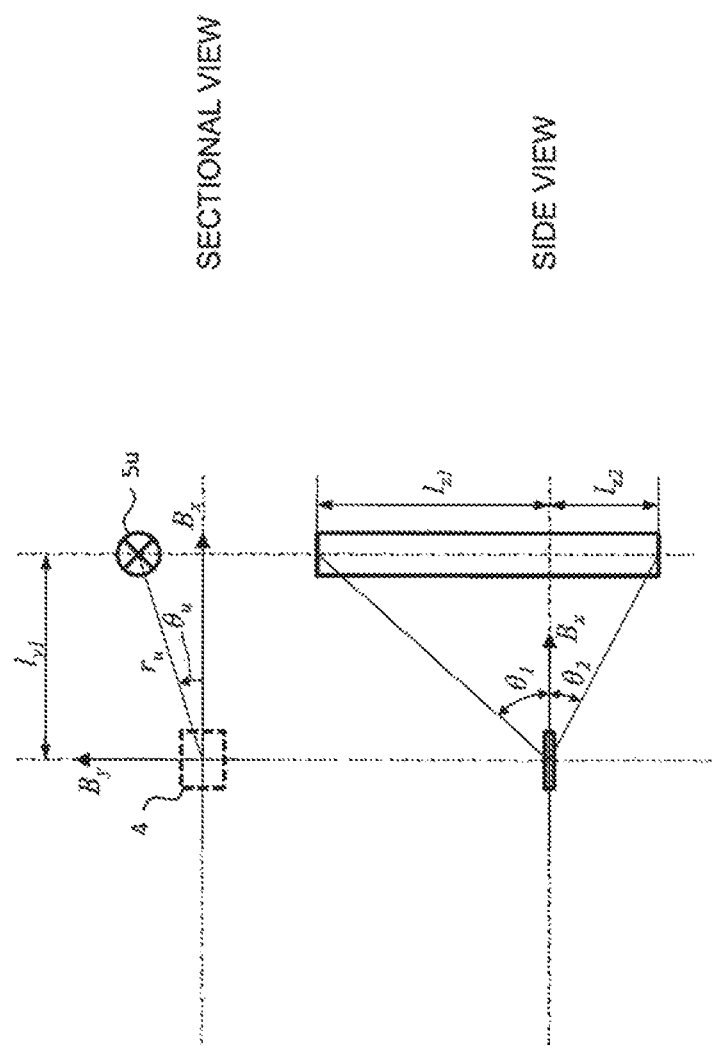
FIG. 3 is a diagram for illustrating a positional relationship between a path through which a U-phase current flows and an angle detector in the first embodiment of the present invention.

FIG. 3 is a diagram for illustrating a positional relationship between the path 5u through which the U-phase current flows and the angle detector 4 in the first embodiment of the present invention. In FIG. 3, a top part is a sectional view, and a bottom part is a side view. When the current flowing in the U phase is Iu1, a magnetic flux density generated by the U-phase current at the angle detector 4 is given by Expression (11).

$$\begin{cases} B_{iu\_x} = -\dfrac{\mu_0 I_u}{4\pi r_u}(\sin\theta_1 + \sin\theta_2)\sin\theta_u \\ \quad = K_{ux} I_u \\ B_{iu\_y} = \dfrac{\mu_0 I_u}{4\pi r_u}(\sin\theta_1 + \sin\theta_2)\sin\theta_u \\ \quad = K_{uy} I_u \end{cases} \quad (11)$$

In Expression (11), "μ0" represents the permeability of the vacuum. An X-axis component and a Y-axis component of the noise magnetic flux can be obtained by multiplying the U-phase current by a coefficient determined by the positional relationship between the path through which the U-phase current flows and the angle detector 4.

In this case, the path of the U-phase current is in the Z-axis direction, but it is to be understood that the path is not limited to this direction, and the same approach can be applied to a single line, a plurality of straight lines, or a three-dimensional curve.

Figure 4:
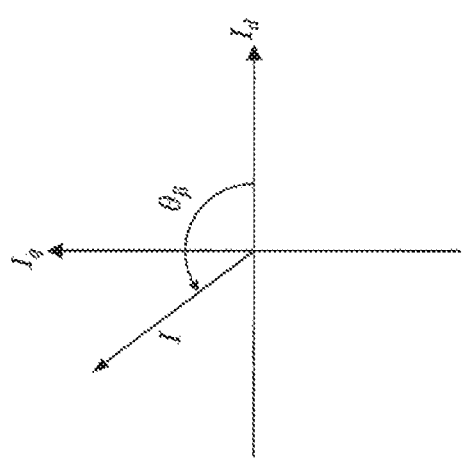
FIG. 4 is a diagram for illustrating a current vector in a rotating coordinate system in the first embodiment of the present invention.

FIG. 4 is a diagram for illustrating a current vector in a rotating coordinate system in the first embodiment of the present invention. The d-axis current Id and the q-axis current Iq are given by Expression (12) where "I" represents the absolute value of the current vector, and "θβ" represents a phase angle from the q axis.

$$\begin{cases} I_d = \sqrt{3}\, I_{rms}\cos\theta_\beta \\ I_q = \sqrt{3}\, I_{rms}\sin\theta_\beta \end{cases} \quad (12)$$

The currents flowing in the respective phases are given by Expression (13) using the electronic angle θe in this state.

$$\begin{cases} I_u = \sqrt{2}\, I_{rms}\sin\left(\theta_e + \theta_\beta + \frac{\pi}{2}\right) \\ I_v = \sqrt{2}\, I_{rms}\sin\left(\theta_e + \theta_\beta - \frac{\pi}{6}\right) \\ I_w = \sqrt{2}\, I_{rms}\sin\left(\theta_e + \theta_\beta - \frac{5}{6}\pi\right) \end{cases} \quad (13)$$

Magnetic flux densities at the angle detector 4 generated by the V-phase current and the W-phase current may be considered similar to Expression (11) for the U phase. Thus, when the noise magnetic flux does not exist, an X-axis component and a Y-axis component of the noise magnetic flux caused by the three-phase currents are given by Expression (14) where "Bmg" represents the magnitude of a magnetic flux density at the angle detector 4.

$$\begin{cases} B_{invw\_x} = \sqrt{2}\, I_{rms}\left\{K_{ux}\sin\left(\theta_e + \theta_\beta + \frac{\pi}{2}\right) + K_{vx}\sin\left(\theta_e + \theta_\beta - \frac{\pi}{6}\right) + K_{wx}\sin\left(\theta_e + \theta_\beta - \frac{5}{6}\pi\right)\right\} \\ \qquad = B_{mg}\{B_{a5}\cos(5\theta_m + \theta_\gamma) + B_{b5}\sin(5\theta_m + \theta_\gamma)\} \\ B_{invw\_y} = \sqrt{2}\, I_{rms}\left\{K_{uy}\sin\left(\theta_e + \theta_\beta + \frac{\pi}{2}\right) + K_{vy}\sin\left(\theta_e + \theta_b - \frac{\pi}{6}\right) + K_{wy}\sin\left(\theta_e + \theta_\beta - \frac{5}{6}\pi\right)\right\} \\ \qquad = B_{mg}\{B_{c5}\cos(5\theta_m + \theta_\gamma) + B_{d5}\sin(5\theta_m + \theta_\gamma)\} \end{cases} \quad (14)$$

In other words, Ba5, Bb5, Bc5, Bd5, and θγ in Expression (14) can be determined based on the current phases and the positional relationship between the paths in which the multiphase AC currents flow and the angle detector 4.

Figure 5:
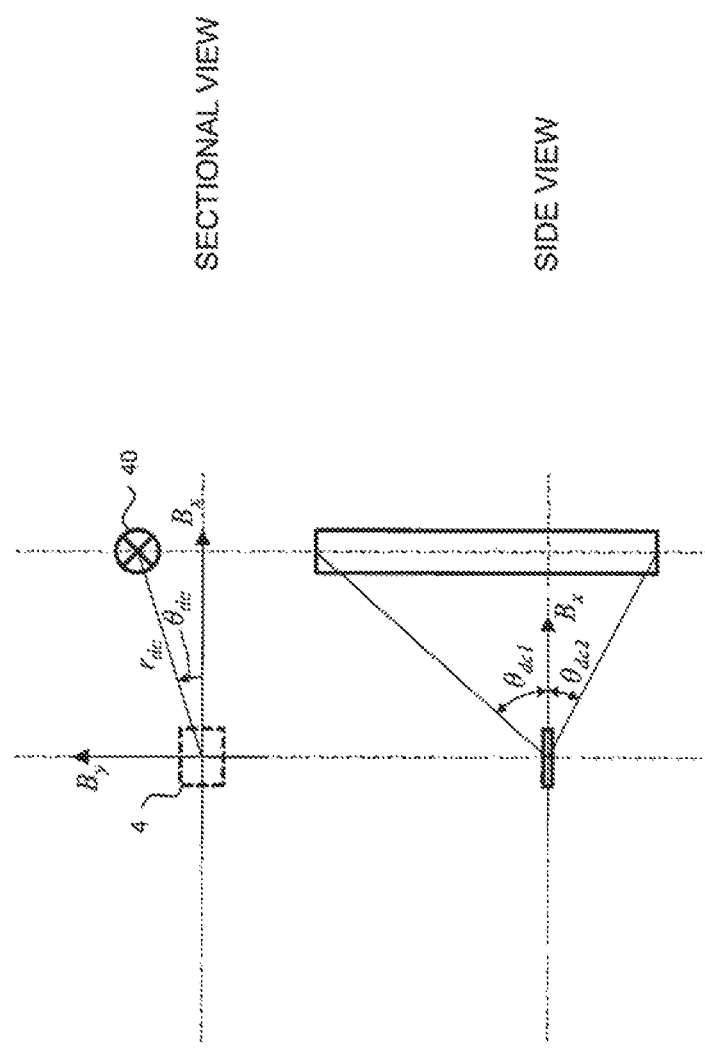
FIG. 5 is a diagram for illustrating a positional relationship between a path through which a DC current flows and the angle detector in the first embodiment of the present invention.

Moreover, the noise magnetic flux caused by the DC current may be considered similar to that caused by the AC currents. FIG. 5 is a diagram for illustrating a positional relationship between a path 40 through which the DC current flows and the angle detector 4 in the first embodiment of the present invention. In FIG. 5, a top part is a sectional view, and a bottom part is a side view. Magnetic flux density at the angle detector 4 generated by the DC current is given by Expression (15) where "Idc" represents the DC current.

$$\begin{cases} B_{idc\_x} = -\dfrac{\mu_0 I_{dc}}{4\pi r_{dc}}(\sin\theta_{dc1} + \sin\theta_{dc2})\sin\theta_{dc} \\ \qquad = K_{dcx} I_{dc} \\ \qquad = B_{mg} B_{a0} \\ B_{idc\_y} = \dfrac{\mu_0 I_{dc}}{4\pi r_{dc}}(\sin\theta_{dc1} + \sin\theta_{dc2})\sin\theta_{dc} \\ \qquad = K_{dcy} I_{dc} \\ \qquad = B_{mg} B_{c0} \end{cases} \quad (15)$$

In other words, Ba0 and Bc0 can be determined by the positional relationship between the path 40 through which the DC current flows and the angle detector 4. In FIG. 5, the path is indicated as one single line, but a case in which there are a plurality of paths may be considered in the same way, and coefficients Kdcx and Kdcy may be determined in accordance with a configuration thereof.

The noise magnetic flux component is minute compared with the main magnetic flux, and Expression (16) is thus satisfied.

$$B_{d0}, B_{a5}, B_{b5}, B_{c0}, B_{c5}, B_{d5} \ll 1 \quad (16)$$

In this state, a unit vector:

$$\vec{t}$$

in the normal direction of $$\vec{B}$$

is given by Expression (17).

$$\vec{t} \approx \begin{pmatrix} -\sin\theta_m \\ \cos\theta_m \end{pmatrix} \quad (17)$$

A detected noise magnetic flux component:

$$\vec{B}_{i\theta}$$

is obtained by projecting $$\vec{B}_i$$

to $$\vec{t}$$

and is thus given by Expression (18) and Expression (19).

$$\vec{B}_{i\theta} = (\vec{B}_i \cdot \vec{t})\vec{t} = \qquad (18)$$

$$\begin{pmatrix} B_{i\theta x} \\ B_{i\theta y} \end{pmatrix} \begin{cases} B_{i\theta x} = \dfrac{B_{a0}}{2} - \dfrac{B_{a0}}{2}\cos 2\theta_m - \dfrac{B_{c0}}{2}\sin 2\theta_m - \dfrac{B_{a5}+B_{d5}}{4}\cos(3\theta_m+\theta_\gamma) - \dfrac{B_{b5}-B_{c5}}{4}\sin(3\theta_m+\theta_\gamma) + \\ \qquad \dfrac{B_{a5}}{2}\cos(5\theta_m+\theta_\gamma) + \dfrac{B_{b5}}{2}\sin(5\theta_m+\theta_\gamma) - \dfrac{B_{a5}-B_{d5}}{4}\cos(7\theta_m+\theta_\gamma) - \dfrac{B_{b5}+B_{c5}}{4}\sin(7\theta_m+\theta_\gamma) \\ B_{i\theta y} = \dfrac{B_{c0}}{2} + \dfrac{B_{c0}}{2}\cos 2\theta_m - \dfrac{B_{a0}}{2}\sin 2\theta_m - \dfrac{B_{b5}-B_{c5}}{4}\cos(3\theta_m+\theta_\gamma) + \dfrac{B_{a5}+B_{d5}}{4}\sin(3\theta_m+\theta_\gamma) + \\ \qquad \dfrac{B_{c5}}{2}\cos(5\theta_m+\theta_\gamma) + \dfrac{B_{d5}}{2}\sin(5\theta_m+\theta_\gamma) + \dfrac{B_{b5}+B_{c5}}{4}\cos(7\theta_m+\theta_\gamma) - \dfrac{B_{a5}-B_{d5}}{4}\sin(7\theta_m+\theta_\gamma) \end{cases}$$

In this state, the detected signals V cos and V sin are given by Expression (20) and Expression (21).

$$V_{cos} = \dfrac{B_{a0}}{2} + \cos\theta_m + \dfrac{\sqrt{B_{a0}^2+B_{c0}^2}}{2}\sin(2\theta_m+\gamma_{c2}) + \dfrac{\sqrt{(B_{a5}+B_{d5})^2+(B_{b5}-B_{c5})^2}}{4}\sin(3\theta_m+\theta_\gamma+\gamma_{c3}) + \qquad (20)$$
$$\dfrac{\sqrt{B_{a5}^2+B_{b5}^2}}{2}\sin(5\theta_m+\theta_\gamma+\gamma_{c5}) + \dfrac{\sqrt{(B_{a5}-B_{d5})^2+(B_{b5}+B_{c5})^2}}{4}\sin(7\theta_m+\theta_\gamma+\gamma_{c7})$$

$$\begin{cases} \cos\gamma_{c2} = -\dfrac{B_{c0}}{\sqrt{B_{a0}^2+B_{c0}^2}},\ \sin\gamma_{c2} = -\dfrac{B_{a0}}{\sqrt{B_{a0}^2+B_{c0}^2}} \\ \cos\gamma_{c3} = -\dfrac{B_{b5}-B_{c5}}{\sqrt{(B_{a5}+B_{d5})^2+(B_{b5}-B_{c5})^2}},\ \sin\gamma_{c3} = -\dfrac{B_{a5}+B_{d5}}{\sqrt{(B_{a5}+B_{d5})^2+(B_{b5}-B_{c5})^2}} \\ \cos\gamma_{c5} = \dfrac{B_{b5}}{\sqrt{B_{a5}^2+B_{b5}^2}},\ \sin\gamma_{c5} = \dfrac{B_{a5}}{\sqrt{B_{a5}^2+B_{b5}^2}} \\ \cos\gamma_{c7} = -\dfrac{B_{b5}+B_{c5}}{\sqrt{(B_{a5}-B_{d5})^2+(B_{b5}+B_{c5})^2}},\ \sin\gamma_{c7} = -\dfrac{B_{a5}-B_{d5}}{\sqrt{(B_{a5}-B_{d5})^2+(B_{b5}+B_{c5})^2}} \end{cases}$$

$$V_{sin} = \dfrac{B_{c0}}{2} + \sin\theta_m + \dfrac{\sqrt{B_{a0}^2+B_{c0}^2}}{2}\sin(2\theta_m+\gamma_{s2}) + \dfrac{\sqrt{(B_{a5}+B_{d5})^2+(B_{b5}-B_{c5})^2}}{4}\sin(3\theta_m+\theta_\gamma+\gamma_{s3}) + \qquad (21)$$
$$\dfrac{\sqrt{B_{c5}^2+B_{d5}^2}}{2}\sin(5\theta_m+\theta_\gamma+\gamma_{s5}) + \dfrac{\sqrt{(B_{a5}-B_{d5})^2+(B_{b5}+B_{c5})^2}}{4}\sin(7\theta_m+\theta_\gamma+\gamma_{s7})$$

$$\begin{cases} \cos\gamma_{s2} = -\dfrac{B_{a0}}{\sqrt{B_{a0}^2+B_{c0}^2}},\ \sin\gamma_{s2} = \dfrac{B_{c0}}{\sqrt{B_{a0}^2+B_{c0}^2}} \\ \cos\gamma_{s3} = -\dfrac{B_{a5}+B_{d5}}{\sqrt{(B_{a5}+B_{d5})^2+(B_{b5}-B_{c5})^2}},\ \sin\gamma_{s3} = -\dfrac{B_{b5}-B_{c5}}{\sqrt{(B_{a5}+B_{d5})^2+(B_{b5}-B_{c5})^2}} \\ \cos\gamma_{s5} = \dfrac{B_{d5}}{\sqrt{B_{a5}^2+B_{b5}^2}},\ \sin\gamma_{s5} = \dfrac{B_{c5}}{\sqrt{B_{a5}^2+B_{b5}^2}} \\ \cos\gamma_{s7} = -\dfrac{B_{a5}-B_{d5}}{\sqrt{(B_{a5}-B_{d5})^2+(B_{b5}+B_{c5})^2}},\ \sin\gamma_{s7} = -\dfrac{B_{b5}+B_{c5}}{\sqrt{(B_{a5}-B_{d5})^2+(B_{b5}+B_{c5})^2}} \end{cases}$$

Expression (20) and Expression (21) are given by standardized equations, but the same description can be applied to a case in which the fundamental wave amplitude is not 1.

On the basis of Expression (20) and Expression (21), Expression (22) is satisfied.

$$\begin{cases} \gamma_{c2} = \gamma_{s2} + \dfrac{\pi}{2} \\ \gamma_{c3} = \gamma_{s3} - \dfrac{\pi}{2} \\ \gamma_{c7} = \gamma_{s7} + \dfrac{\pi}{2} \end{cases} \qquad (22)$$

Therefore, a noise magnetic flux of 0th order rotation caused by the DC current causes an angle error of the rotation 1st order. A noise magnetic flux of 5th order rotation caused by the multi-phase AC currents causes an angle error of 4th order rotation or 6th order rotation.

When Expression (23) is satisfied, a component of 3rd order rotation of the signal error is zero.

$$\begin{cases} B_{a5} = -B_{d5} \\ B_{b5} = B_{c5} \end{cases} \qquad (23)$$

Therefore, a signal error caused by the noise magnetic flux of 5th order rotation due to the multi-phase AC currents contains components of 5th order rotation and 7th order rotation, and causes an angle error of 6th order rotation.

Further, when Expression (24) is satisfied, a component of 7th order rotation of the signal error is zero.

$$\begin{cases} B_{a5} = B_{d5} \\ B_{b5} = -B_{c5} \end{cases} \quad (24)$$

Therefore, a signal error caused by the noise magnetic flux of 5th order rotation due to the multi-phase AC currents contains components of 3rd order rotation and 5th order rotation, and causes an angle error of 4th order rotation.

The disturbance magnetic flux given by Expression (10) is 0th order rotation caused by the DC current and 5th order rotation caused by the multi-phase AC currents. However, the actually detected signals include components of 0th order rotation, 2nd order rotation, 3rd order rotation, 5th order rotation, and 7th order rotation as given by Expression (20) and Expression (21).

When correction is made by a method in Patent Literature 2, the components of 0th order rotation and 5th order rotation are suppressed by adjusting correction coefficients, but the noise components of 2nd order rotation, 3rd order rotation, and 7th order rotation remain. In other words, when the angle detector is used in the saturated state with respect to the main component direction of the magnet magnetic flux vector, the angle error of rotation 1st order caused by the DC current and the angle error of 4th order rotation and 6th order rotation caused by the AC currents remain with the method in Patent Literature 2.

In contrast, in the first embodiment, when the angle detector is used in the saturated state with respect to the main component direction of the magnet magnetic flux vector, the signal errors are reduced based on Expression (25) in order to suppress the angle errors of rotation 1st order, 4th order rotation, and 6th order rotation.

Specifically, this correction signal is obtained by obtaining components determining the phases and the amplitudes such as the DC current component correction signals h cos1 and h sin1 based on a phase correction constant and an amplitude correction constant determined by the arrangement of the angle detector.

A signal error caused by the noise magnet flux of rotation Pth order due to the multi-phase AC currents in the AC rotary machine 1 having the number P of pole pairs contains a component of rotation Pth order as well as at least one of a component of rotation (P−2Psns) order and a component of rotation (P+2Psns) order. Thus, the control device for an AC rotary machine according to the first embodiment can provide an unprecedented effect of being able to suppress an angle error of at least one of (P−Psns)th order and (P+Psns)th order by using a correction signal determined based on the current vector and the arrangement of the rotation angle detector.

Specifically, this correction signal is obtained by obtaining components determining the phases and the amplitudes such as the AC current component correction signals h cos2 and h sin2 based on a phase correction constant and an amplitude correction constant determined by the arrangement of the current vector and the angle detector.

Second Embodiment

Figure 6:
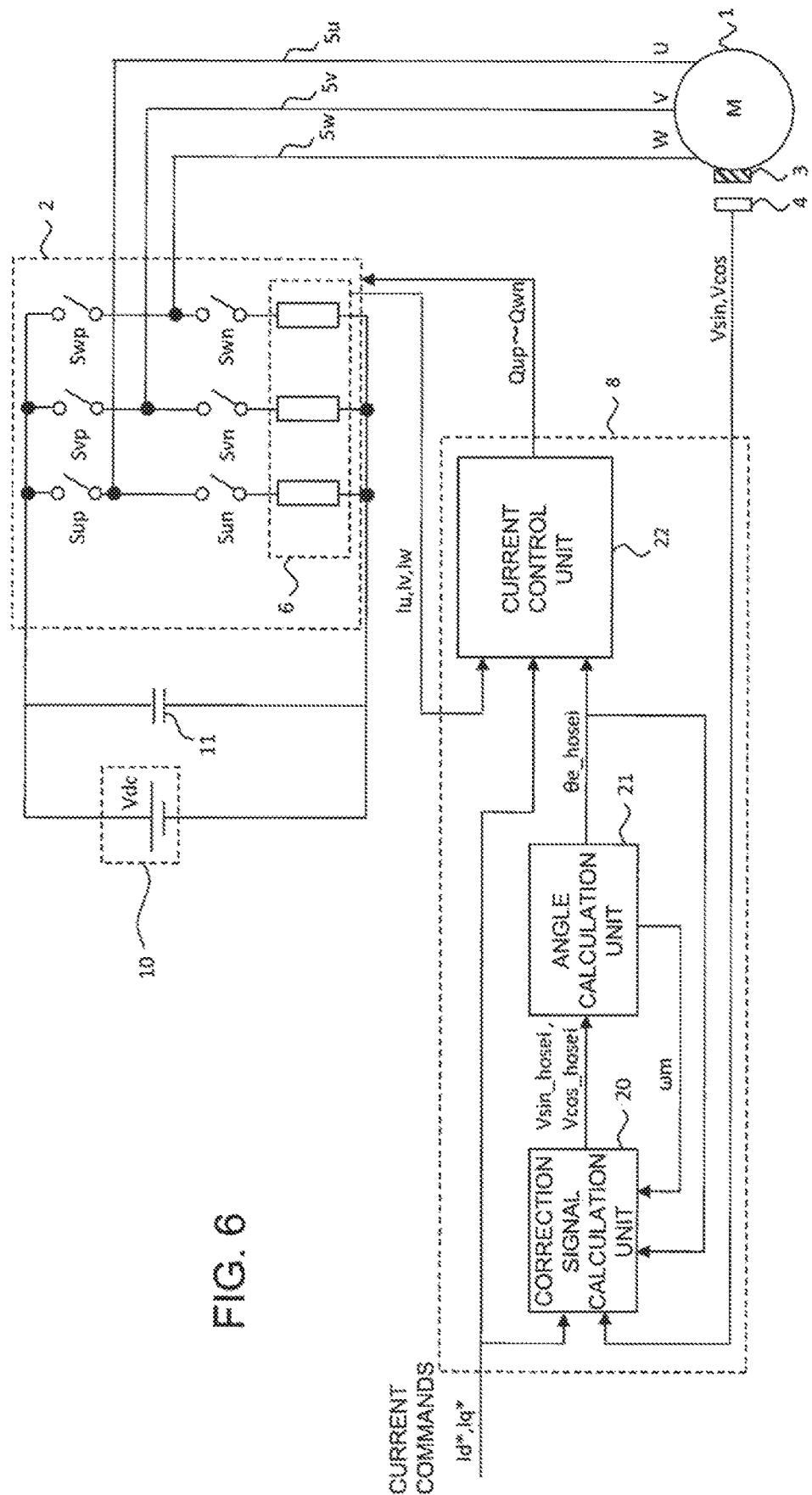
FIG. 6 is a diagram for illustrating the overall configuration of the control device for an AC rotary machine according to the first embodiment of the present invention.

FIG. 6 is a diagram for illustrating the overall configuration of the control device for an AC rotary machine according to the first embodiment of the present invention. The configuration illustrated in FIG. 6 in a second embodiment of the present invention is different from the configuration illustrated in FIG. 1 in the first embodiment in that a smoothing capacitor 11 is further provided. Thus, a description is not given of points redundant with the first embodiment, and a description is now mainly given of details relating to the smoothing capacitor 11.

The smoothing capacitor 11 is connected in parallel to the DC power supply 10, and suppresses the fluctuation of the $$\begin{cases} h_{cos1} = \frac{B_{a0}}{2} + \frac{\sqrt{B_{a0}^2 + B_{c0}^2}}{2} \sin(2\theta_m + \gamma_{c2}) \\ h_{cos2} = \frac{\sqrt{(B_{a5} + B_{d5})^2 + (B_{b5} - B_{c5})^2}}{4} \sin(3\theta_m + \theta_y + \gamma_{c3}) + \\ \quad \frac{\sqrt{B_{a5}^2 + B_{b5}^2}}{2} \sin(5\theta_m + \theta_y + \gamma_{c5}) + \frac{\sqrt{(B_{a5} - B_{d5})^2 + (B_{b5} + B_{c5})^2}}{4} \sin(7\theta_m + \theta_y + \gamma_{c7}) \\ h_{sin1} = \frac{B_{c0}}{2} + \frac{\sqrt{B_{a0}^2 + B_{c0}^2}}{2} \sin(2\theta_m + \gamma_{s2}) \\ h_{sin2} = \frac{\sqrt{(B_{a5} + B_{d5})^2 + (B_{b5} - B_{c5})^2}}{4} \sin(3\theta_m + \theta_y + \gamma_{s3}) + \\ \quad \frac{\sqrt{B_{c5}^2 + B_{d5}^2}}{2} \sin(5\theta_m + \theta_y + \gamma_{s5}) + \frac{\sqrt{(B_{a5} - B_{d5})^2 + (B_{b5} + B_{c5})^2}}{4} \sin(7\theta_m + \theta_y + \gamma_{s7}) \end{cases} \quad (25)$$

The signal error caused by the noise magnetic flux of 0th order rotation due to the DC current contains a component of 0th order rotation and a component of 2nd order rotation. Thus, the control device for an AC rotary machine according to the first embodiment can provide an unprecedented effect of being able to suppress the angle error of 1st order by using the correction signal determined based on the arrangement of the rotation angle detector.

bus current, to thereby achieve a stable DC current. In addition to a true capacitor capacitance C, the smoothing capacitor 11 has an equivalent serial resistance Rc and a lead inductance Lc, which are not illustrated in detail.

As described in the first embodiment, the noise magnetic flux of 0th order rotation is caused by the flow of the DC current between the DC power supply 10 and the inverter 2. A noise magnetic flux of 0th order rotation is also caused by a flow of a DC current between the smoothing capacitor 11 and the inverter 2. However, the amplitude of the noise magnetic flux changes due to a difference in path of flow.

Figure 7:
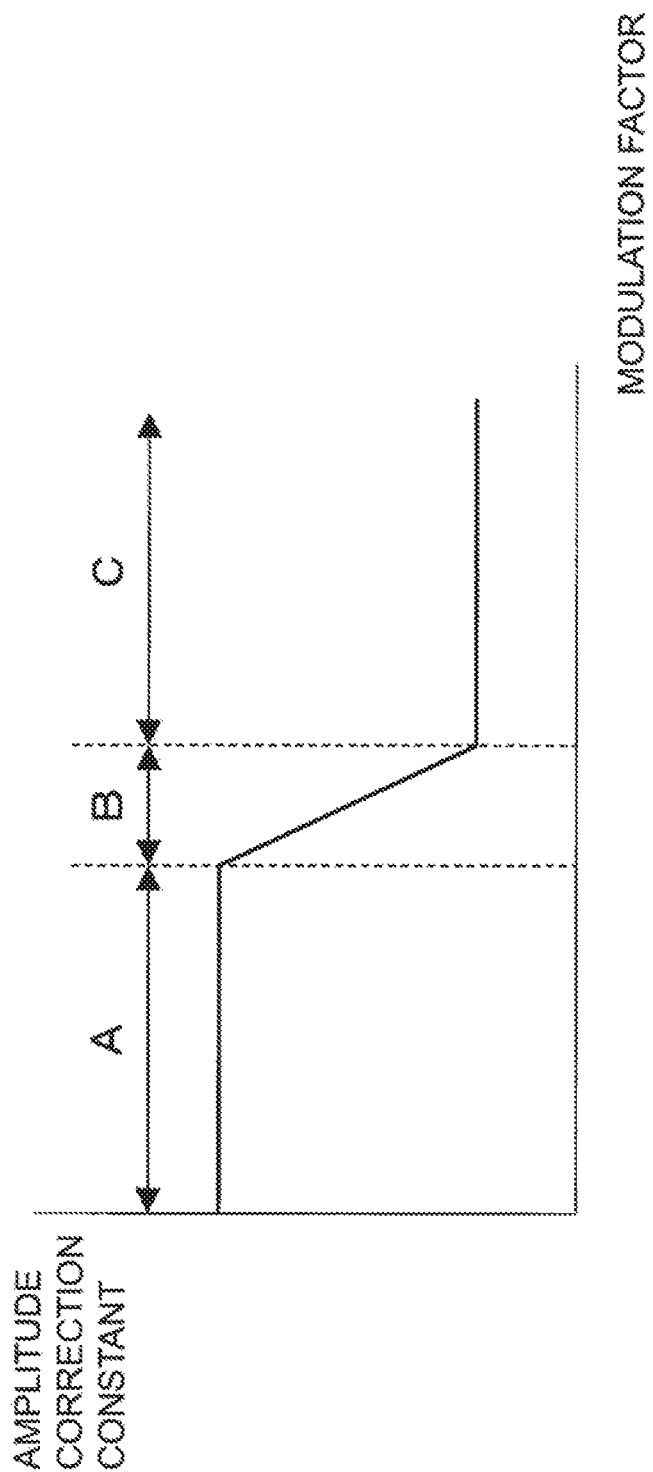
FIG. 7 is a diagram for illustrating an example of a relationship between a modulation factor and an amplitude correction constant in the control device for an AC rotary machine according to a second embodiment of the present invention.

FIG. 7 is a diagram for illustrating an example of a relationship between the modulation factor and the amplitude correction constant in the control device for an AC rotary machine according to the second embodiment of the present invention. In a section A having a low modulation factor, an applied voltage exceeds a required voltage, and the smoothing capacitor 11 is charged in time. Therefore, a DC current is supplied mainly from the smoothing capacitor 11. The DC current component correction signals can be determined based on the amplitude correction constant and the phase correction constant determined by the positional relationship between the angle detector 4 and the path of the DC current flowing between the smoothing capacitor 11 and the inverter 2.

Meanwhile, in a section C having a high modulation factor, the voltage is saturated, and the smoothing capacitor 11 is not charged in time. Therefore, a DC current is supplied mainly from the DC power supply 10. The DC current component correction signals can be determined based on the amplitude correction constant and the phase correction constant determined by the positional relationship between the angle detector 4 and the path of the DC current flowing between the DC power supply 10 and the inverter 2.

A section B between the section A and the section C is a transition section in which the DC current is supplied from the DC power supply 10 and the DC current is supplied from the smoothing capacitor 11 at the same time. In FIG. 7, a characteristic of the section B is expressed as a straight line, but the characteristic may be such that the section A and the section B are connected to each other by a curve in accordance with the change.

In other words, the amplitude correction constant for determining the DC component correction signal can be obtained by using the modulation factor as information on the path through which the DC current flows. The modulation factor is used as the path information in this configuration, but it is to be understood that other parameters such as the supply voltage to the inverter 2 and the number of rotations of the rotary machine 1 may be used.

In the second embodiment, when the smoothing capacitor is provided between the DC power supply and the inverter in this manner, the correction signal calculation unit is configured to determine the correction signals based on the arrangement of the angle detector and the information on the path through which the DC current flows. As a result, when the number of pole pairs of the magnetic flux generator is Psns, the angle error of Psns-th order can be suppressed by using the correction signals determined in this manner independently of the path of the DC current.

Specifically, the correction coefficients are obtained by obtaining the components that determine the phase and the amplitude based on the phase correction constant and the amplitude correction constant, which can be determined by the arrangement of the angle detector and the information on the path through which the DC current flows.

Third Embodiment

A third embodiment of the present invention is different from the second embodiment, in which the one path is considered, in that two paths through which DC currents flow are considered in the third embodiment. For the sake of description, a description is given based on the assumption that the shaft angle multiplier of the angle detector 4 is 1, but the same applies to a case in which the shaft angle multiplier is different.

Figure 8:
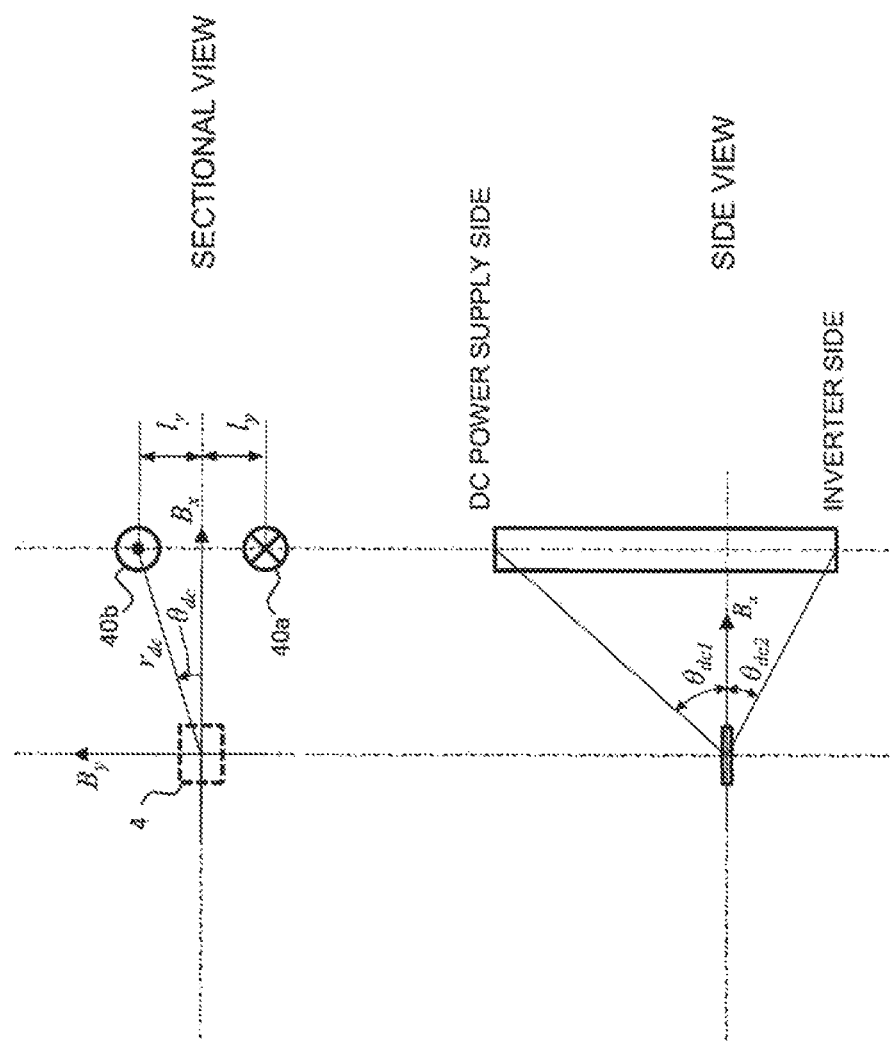
FIG. 8 is a diagram for illustrating a positional relationship between two paths through which the DC current flows and the angle detector in a third embodiment of the present invention.

FIG. 8 is a diagram for illustrating a positional relationship between paths 40a and 40b through which the DC currents flow and the angle detector 4 in the third embodiment of the present invention. In FIG. 8, a top part is a sectional view, and a bottom part is a side view. Moreover, in the side view, an upside indicates a DC power supply side, and a bottom side indicates an inverter side. Moreover, a description is given based on the assumption that the DC current is "Idc".

Further, the description is given based on the assumption that the two paths are paths 40a and 40b, and the current flowing through the path 40a and the current flowing through the path 40b are opposite to each other in direction as illustrated in FIG. 8.

The path 40a is a path for the flow from the DC power supply to the inverter. A magnetic flux density caused by the DC current flowing through the path 40a at the angle detector 4 is given by Expression (26).

$$\begin{cases} B_{idc1\_x} = \dfrac{\mu_0 I_{dc}}{4\pi r_{dc}}(\sin\theta_{dc1} + \sin\theta_{dc2})\sin\theta_{dc} \\ B_{idc1\_y} = \dfrac{\mu_0 I_{dc}}{4\pi r_{dc}}(\sin\theta_{dc1} + \sin\theta_{dc2})\cos\theta_{dc} \end{cases} \quad (26)$$

Meanwhile, the path 40b is a path for the flow from the inverter to the DC power supply. A magnetic flux density generated by the DC current flowing through the path 40b at the angle detector 4 is given by Expression (27).

$$\begin{cases} B_{idc2\_x} = \dfrac{\mu_0 I_{dc}}{4\pi r_{dc}}(\sin\theta_{dc1} + \sin\theta_{dc2})\sin\theta_{dc} \\ B_{idc2\_y} = -\dfrac{\mu_0 I_{dc}}{4\pi r_{dc}}(\sin\theta_{dc1} + \sin\theta_{dc2})\cos\theta_{dc} \end{cases} \quad (27)$$

In other words, the magnetic flux densities at the angle detector 4 generated by the DC currents flowing through the path 40a and the path 40b are given by Expression (28).

$$\begin{cases} B_{idc\_x} = \dfrac{\mu_0 I_{dc}}{2\pi r_{dc}}(\sin\theta_{dc1} + \sin\theta_{dc2})\sin\theta_{dc} \\ B_{idc\_y} = 0 \end{cases} \quad (28)$$

The DC current component correction signals h sin1 and h cos1 are given by Expression (29) in this state.

$$\begin{cases} h_{cos1} = \dfrac{B_{a0}}{2}\{1 - \cos 2\theta_m\} \\ h_{cos2} = -\dfrac{B_{a0}}{2}\sin 2\theta_m \end{cases} \quad (29)$$

Each of the DC current component correction signals h sin1 and h cos1 is calculated by adding two terms (that is, four terms in total) in Expression (25). However, h sin1 can be expressed by one term in Expression (29), and thus the DC current component correction signals h sin1 and h cos1 can be calculated through use of the terms, the number of which is reduced to three. Therefore, there can be provided such an unprecedented effect that the direction on the XY plane of the magnetic flux generated by the DC power supply at the position of the angle detector is set to the X-axis direction or the Y-axis direction of the angle detector, to thereby be able to reduce a processing load imposed by the angle calculation, which has a relatively high update frequency.

In other words, when a main path from the inverter to the DC power supply and a main path from the DC power supply to the inverter are symmetrical about the XZ plane of the angle detector, there can be provided the unprecedented effect of being able to reduce the processing load imposed by the angle calculation having the relatively high update frequency. The main paths are arranged symmetrically about the XZ plane in this case, but the same effect can be provided also when the main paths are arranged symmetrically about the YZ plane.

Moreover, when Expression (23) is satisfied, the AC current component correction signals h sin2 and h cos2 can be calculated by Expression (30).

$$\begin{cases} h_{cos2} = \frac{\sqrt{B_{a5}^2 + B_{b5}^2}}{2}\{\sin(5\theta_m + \theta_y + \gamma_{s5} - \frac{\pi}{2}) + \sin(7\theta_m + \theta_y + \gamma_{s5} + \frac{\pi}{2})\} \\ \qquad = -\sqrt{B_{a5}^2 + B_{b5}^2}\,\sin\theta_m\sin(6\theta_m + \theta_y + \gamma_{s5}) \\ h_{sin2} = \frac{\sqrt{B_{a5}^2 + B_{b5}^2}}{2}\{\sin(5\theta_m + \theta_y + \gamma_{s5}) + \sin(7\theta_m + \theta_y + \gamma_{s5})\} \\ \qquad = \sqrt{B_{a5}^2 + B_{b5}^2}\,\cos\theta_m\sin(6\theta_m + \theta_y + \gamma_{s5}) \end{cases} \quad (30)$$

When Expression (30) is used, terms of 5th order and 7th order are not required to be individually calculated, and the correction signals can be calculated through use of a sine of 1st order, a cosine of 1st order, and a sine of 6th order.

In many cases, when the correction signals are obtained, a table prepared in advance is read, to thereby calculate the sines. When Expression (23) is not satisfied, sines of 3rd order, sines of 5th order, and sines of 7th order in two types of phases (namely, six sines) are required to be calculated in the AC current component correction signals h sin2 and h cos2 given by Expression (25).

In contrast, when Expression (23) is satisfied, the AC current component correction signals can be calculated by calculating the sine of 1st order, the cosine of 1st order, and the sine of 6th order (namely, a total of three of the sines and cosine). Thus, the number of references to the table can be reduced by employing the method in the third embodiment, to thereby be able to reduce the processing load imposed by having the high update frequency.

Moreover, also when Expression AC current component correction signals similarly given by Expression (31).

$$\begin{cases} h_{cos2} = \frac{\sqrt{B_{a5}^2 + B_{b5}^2}}{2}\{\sin(3\theta_m + \theta_y + \gamma_{s5} + \frac{\pi}{2}) + \sin(5\theta_m + \theta_y + \gamma_{s5} - \frac{\pi}{2})\} \\ \qquad = \sqrt{B_{a5}^2 + B_{b5}^2}\,\sin\theta_m\sin(4\theta_m + \theta_y + \gamma_{s5}) \\ h_{sin2} = \frac{\sqrt{B_{a5}^2 + B_{b5}^2}}{2}\{\sin(3\theta_m + \theta_y + \gamma_{s5}) + \sin(5\theta_m + \theta_y + \gamma_{s5})\} \\ \qquad = \sqrt{B_{a5}^2 + B_{b5}^2}\,\cos\theta_m\sin(4\theta_m + \theta_y + \gamma_{s5}) \end{cases} \quad (31)$$

When Expression (31) is used, terms of 3rd order and 5th order are not required to be individually calculated, and the correction signals can be calculated through use of a sine of 1st order, a cosine of 1st order, and a sine of 4th order.

When Expression (24) is not satisfied, sines of 3rd order, sines of 5th order, and sines of 7th order in two types of phases (namely, six sines) are required to be calculated in the AC current component correction signals h sin2 and h cos2 given by Expression (25). In contrast, when Expression (24) is satisfied, the AC current component correction signals can be calculated by calculating the sine of 1st order, the cosine of 1st order, and the sine of 4th order (namely, a total of three of the sines and cosine). Thus, the number of references to the table can be reduced by employing the method in the third embodiment, to thereby be able to reduce the processing load imposed by the angle calculation having the high update frequency.

In other words, when the amplitudes of and the phase difference between the X-axis component and the Y-axis component of the noise magnetic flux of nth order rotation due to the multi-phase AC currents are the same and $\pi/2$, respectively, the AC current component correction signals can be calculated through use of the sine and cosine of 1st order and the sines of $(n\pm 1)$th order. As a result, there can be provided such an unprecedented effect that the processing load imposed by the angle calculation having the high update frequency can be reduced.

Moreover, when Expression (23) and Expression (29) are satisfied, the correction signals can be calculated through use of Expression (32). When Expression (32) is used, the correction signals can be calculated through use of the sine of 1st order, the cosine of 1st order, and the sine of 6th order.

$$\begin{cases} h_{cos1} = B_{a0}\sin^2\theta_m \\ h_{cos2} = \frac{\sqrt{B_{a5}^2 + B_{b5}^2}}{2}\{\sin(5\theta_m + \theta_y + \gamma_{s5} - \frac{\pi}{2}) + \sin(7\theta_m + \theta_y + \gamma_{s5} + \frac{\pi}{2})\} \\ \quad = -\sqrt{B_{a5}^2 + B_{b5}^2}\sin\theta_m\sin(6\theta_m + \theta_y + \gamma_{s5}) \\ h_{sin1} = -B_{a0}\sin\theta_m\cos\theta_m \\ h_{sin2} = \frac{\sqrt{B_{a5}^2 + B_{b5}^2}}{2}\{\sin(5\theta_m + \theta_y + \gamma_{s5}) + \sin(7\theta_m + \theta_y + \gamma_{s5})\} \\ \quad = \sqrt{B_{a5}^2 + B_{b5}^2}\cos\theta_m\sin(6\theta_m + \theta_y + \gamma_{s5}) \end{cases} \quad (32)$$

In Expression (25), it is required to calculate the sine of 2nd order, the sine of 3rd order, the sine of 5th order, and the sine of 7th order in the two types of phase (namely, the eight sines). In contrast, when Expression (23) and Expression (29) are satisfied, the correction signals can be calculated by calculating the sine of 1st order, the cosine of 1st order, and the sine of 6th order (namely, a total of three of the sines and cosine). Thus, the number of references to the table can be reduced by employing the method in the third embodiment, to thereby be able to reduce the processing load imposed by the angle calculation having the high update frequency.

When Expression (24) and Expression (29) are satisfied, the correction signals can be calculated through use of Expression (33). When Expression (33) is used, the correction signals can be calculated through use of the sine of 1st order, the cosine of 1st order, and the sine of 4th order.

$$\begin{cases} h_{cos1} = B_{a0}\sin^2\theta_m \\ h_{cos2} = \frac{\sqrt{B_{a5}^2 + B_{b5}^2}}{2}\{\sin(3\theta_m + \theta_y + \gamma_{s5} - \frac{\pi}{2}) + \sin(5\theta_m + \theta_y + \gamma_{s5} + \frac{\pi}{2})\} \\ \quad = \sqrt{B_{a5}^2 + B_{b5}^2}\sin\theta_m\sin(4\theta_m + \theta_y + \gamma_{s5}) \\ h_{sin1} = -B_{a0}\sin\theta_m\cos\theta_m \\ h_{sin2} = \frac{\sqrt{B_{a5}^2 + B_{b5}^2}}{2}\{\sin(3\theta_m + \theta_y + \gamma_{s5}) + \sin(5\theta_m + \theta_y + \gamma_{s5})\} \\ \quad = \sqrt{B_{a5}^2 + B_{b5}^2}\cos\theta_m\sin(4\theta_m + \theta_y + \gamma_{s5}) \end{cases} \quad (33)$$

In Expression (25), it is required to calculate the sine of 2nd order, the sine of 3rd order, the sine of 5th order, and the sine of 7th order in the two types of phase (namely, the eight sines). In contrast, when Expression (23) and Expression (29) are satisfied, the correction signals can be calculated by calculating the sine of 1st order, the cosine of 1st order, and the sine of 4th order (namely, a total of three of the sines and cosine). Thus, the number of references to the table can be reduced by employing the method in the third embodiment, to thereby be able to reduce the processing load imposed by the angle calculation having the high update frequency.

In other words, when the main path from the inverter to the DC power supply and the main path from the DC power supply to the inverter are symmetrical about the XZ plane or the YZ plane of the angle detector, and the amplitudes of and the phase difference between the X-axis component and the Y-axis component of the noise magnetic flux of nth order rotation due to the multi-phase AC currents are the same and $\pi/2$, respectively, there can be provided the unprecedented effect of being able to reduce the processing load imposed by the angle calculation having the high update frequency.

Fourth Embodiment

In the third embodiment, a description is given of the arrangement of one set of main paths of the inverter. In contrast, in a fourth embodiment of the present invention, a description is given of an arrangement of a path 40c, a path 40d, a path 40e, and a path 40f through which DC currents flow in an inverter constructed by a first inverter and a second inverter. For the sake of description, a description is given based on the assumption that the shaft angle multiplier of the angle detector 4 is 1, but the same applies to a case in which the shaft angle multiplier is different.

Figure 9:
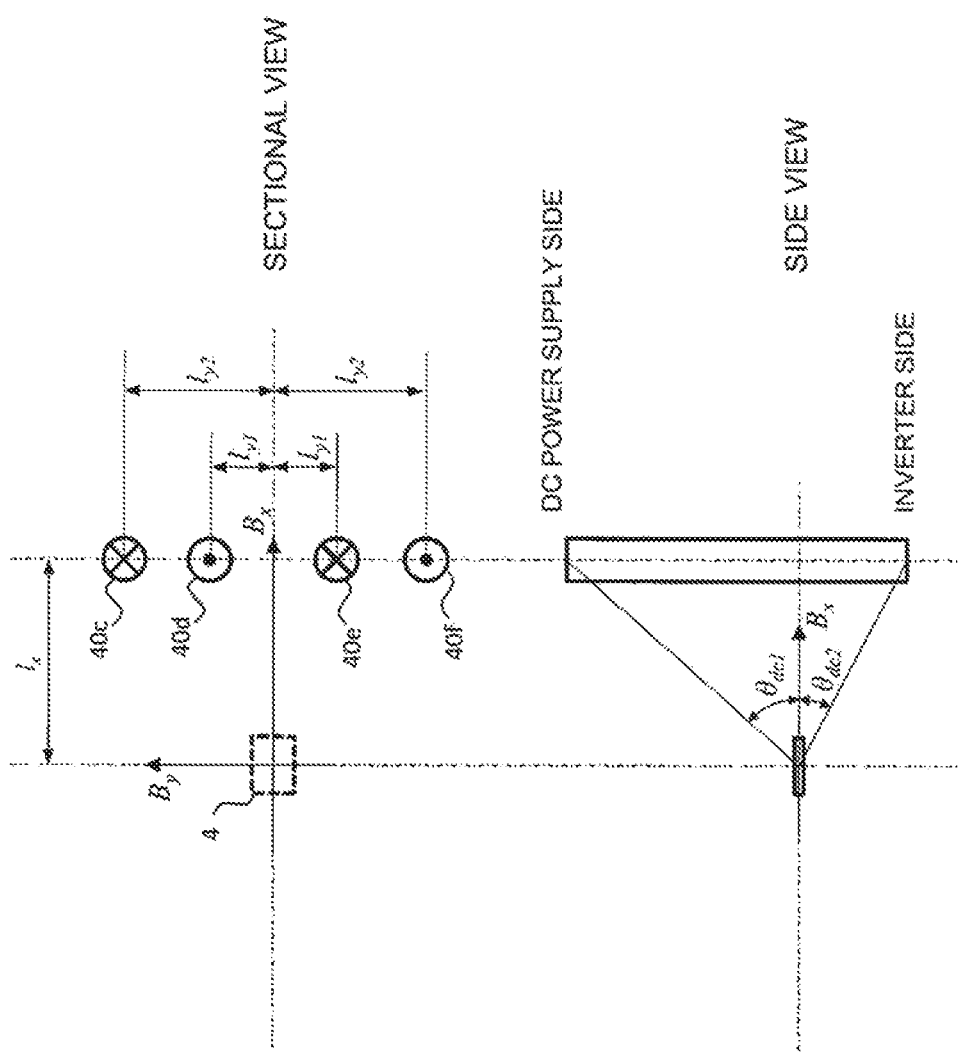
FIG. 9 is a diagram for illustrating a positional relationship between four paths through which the DC currents flow and the angle detector in a fourth embodiment of the present invention.

FIG. 9 is a diagram for illustrating a positional relationship between the path 40c, the path 40d, the path 40e, and the path 40f through which the DC current flows and the angle detector 4 in the fourth embodiment of the present invention. In FIG. 9, a top part is a sectional view, and a bottom part is a side view. Moreover, in the side view, an upside indicates a DC power supply side, and a bottom side indicates an inverter side. Moreover, a description is given based on the assumption that the DC current is "Idc".

Moreover, a description is given based on the assumption that the four paths are the paths 40c and 40d for the first inverter, and the paths 40e and 40f for the second inverter, and the currents flowing through the paths 40c and 40e and the currents flowing through the paths 40d and 40f are opposite to each other in direction as illustrated in FIG. 9.

The path 40c is a path for the flow from the DC power supply to the first inverter. A magnetic flux density generated by the DC current flowing through the path 40c at the angle detector 4 is given by Expression (34).

$$\begin{cases} B_{idc11\_x} = \dfrac{\mu_0 I_{dc} l_{y2}}{4\pi(l_x^2 + l_{y2}^2)}(\sin\theta_{dc1} + \sin\theta_{dc2}) \\ B_{idc11\_y} = \dfrac{\mu_0 l_x}{4\pi(l_x^2 + l_{y2}^2)}(\sin\theta_{dc1} + \sin\theta_{dc2}) \end{cases} \quad (34)$$

The path 40$d$ is a path for the flow from the first inverter to the DC power supply. A magnetic flux density generated by the DC current flowing through the path 40$d$ at the angle detector 4 is given by Expression (35).

$$\begin{cases} B_{idc12\_x} = \dfrac{\mu_0 I_{dc} l_{y1}}{4\pi(l_x^2 + l_{y1}^2)}(\sin\theta_{dc1} + \sin\theta_{dc2}) \\ B_{idc12\_y} = -\dfrac{\mu_0 l_x}{4\pi(l_x^2 + l_{y1}^2)}(\sin\theta_{dc1} + \sin\theta_{dc2}) \end{cases} \quad (35)$$

Similarly, the path 40$e$ is a path for the flow from the DC power supply to the second inverter. A magnetic flux density generated by the DC current flowing through the path 40$e$ at the angle detector 4 is given by Expression (36).

$$\begin{cases} B_{idc21\_x} = \dfrac{\mu_0 I_{dc} l_{y1}}{4\pi(l_x^2 + l_{y1}^2)}(\sin\theta_{dc1} + \sin\theta_{dc2}) \\ B_{idc21\_y} = \dfrac{\mu_0 l_x}{4\pi(l_x^2 + l_{y1}^2)}(\sin\theta_{dc1} + \sin\theta_{dc2}) \end{cases} \quad (36)$$

The path 40$f$ is a path for the flow from the second inverter to the DC power supply. A magnetic flux density generated by the DC current flowing through the path 40$f$ at the angle detector 4 is given by Expression (37).

$$\begin{cases} B_{idc22\_x} = \dfrac{\mu_0 I_{dc} l_{y2}}{4\pi(l_x^2 + l_{y2}^2)}(\sin\theta_{dc1} + \sin\theta_{dc2}) \\ B_{idc22\_y} = \dfrac{\mu_0 l_x}{4\pi(l_x^2 + l_{y2}^2)}(\sin\theta_{dc1} + \sin\theta_{dc2}) \end{cases} \quad (37)$$

In other words, the magnetic flux densities at the angle detector 4 generated by the DC currents flowing through the path 40$c$, the path 40$d$, the path 40$e$, and the path 40$f$ are given by Expression (38).

$$\begin{cases} B_{idc\_x} = \dfrac{\mu_0 I_{dc}}{2\pi}(\sin\theta_{dc1} + \sin\theta_{dc2})\left( \dfrac{l_{y1}}{l_x^2 + l_{y1}^2} - \dfrac{l_{y2}}{l_x^2 + l_{y2}^2} \right) \\ B_{idc\_y} = 0 \end{cases} \quad (38)$$

The DC current component correction signals h sin1 and h cos1 are given by Expression (39) in this state.

$$\begin{cases} h_{cos1} = \dfrac{B_{d0}}{2}\{1 - \cos 2\theta_m\} \\ h_{sin1} = \dfrac{B_{d0}}{2}\sin 2\theta_m \end{cases} \quad (39)$$

Each of the DC current component correction signals h sin1 and h cos1 is calculated by adding two terms (that is, four terms in total) in Expression (25). However, h sin1 can be expressed by one term in Expression (39), and thus the DC current component correction signals h sin1 and h cos1 can be calculated through use of the terms, the number of which is reduced to three. Therefore, when the main path from the DC power supply to the first inverter and the main path from the second inverter to the DC power supply are symmetrical about the XZ plane of the angle detector, and the main path from the first inverter to the DC power supply and the main path from the DC power supply to the second inverter are symmetrical about the XZ plane of the angle detector, there can be provided such an unprecedented effect that the processing load imposed by the angle calculation having the high update frequency can be reduced.

The main paths are arranged symmetrically about the XZ plane in this case, but the same effect can be provided also when the main paths are arranged symmetrically about the YZ plane.

Fifth Embodiment

In the fourth embodiment, a description is given of the arrangement of the path 40$c$, the path 40$d$, the path 40$e$, and the path 40$f$ through which the DC currents flow in the inverter constructed by the first inverter and the second inverter. In contrast, in a fifth embodiment of the present invention, a description is given of a case in which the four paths are different from those in the fourth embodiment. Thus, a description is not given of points redundant with the fourth embodiment. Further, for the sake of description, a description is given based on the assumption that the shaft angle multiplier of the angle detector 4 is 1, but the same applies to a case in which the shaft angle multiplier is different.

Figure 10:
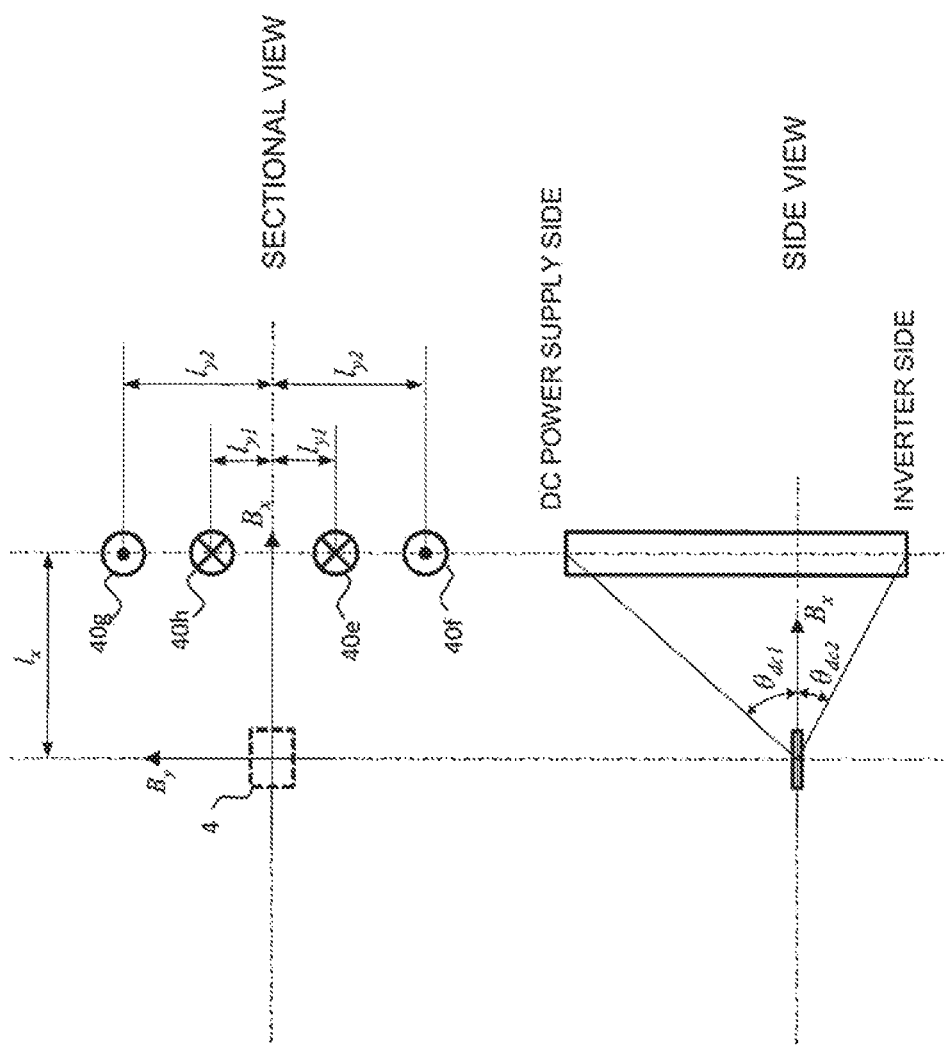
FIG. 10 is a diagram for illustrating a positional relationship between four paths through which the DC currents flow and the angle detector in a fifth embodiment of the present invention.

FIG. 10 is a diagram for illustrating a positional relationship between the path 40$c$, the path 40$d$, a path 40$g$, and a path 40$h$ through which the DC currents flow and the angle detector 4 in the fifth embodiment of the present invention. In FIG. 10, a top part is a sectional view, and a bottom part is a side view. Moreover, in the side view, an upside indicates a DC power supply side, and a bottom side indicates an inverter side. Moreover, a description is given based on the assumption that the DC current is "Idc".

A configuration illustrated in FIG. 10 in the fifth embodiment is different from FIG. 9 of the fourth embodiment in that the paths 40$g$ and 40$h$ are employed in place of the paths 40$c$ and 40$d$. More specifically, the path 40$c$ and the path 40$g$ have the same positional relationship with respect to the angle detector 4, but have the directions of the currents opposite to each other. Similarly, the path 40$d$ and the path 40$h$ have the same positional relationship with respect to the angle detector 4, but have the directions of the currents opposite to each other.

The path 40$g$ is a path for the flow from the first inverter to the DC power supply. A magnetic flux density generated by the DC current flowing through the path 40$g$ at the angle detector 4 is given by Expression (40).

$$\begin{cases} B_{idc12\_x} = \dfrac{\mu_0 I_{dc} l_{y2}}{4\pi(l_x^2 + l_{y2}^2)}(\sin\theta_{dc1} + \sin\theta_{dc2}) \\ B_{idc12\_y} = -\dfrac{\mu_0 l_x}{4\pi(l_x^2 + l_{y2}^2)}(\sin\theta_{dc1} + \sin\theta_{dc2}) \end{cases} \quad (40)$$

Meanwhile, the path 40$h$ is a path for the flow from the DC power supply to the first inverter. A magnetic flux density generated by the DC current flowing through the path 40h at the angle detector 4 is given by Expression (41).

$$\begin{cases} B_{idc11\_x} = -\dfrac{\mu_0 I_{dc} l_{y1}}{4\pi(l_x^2 + l_{y1}^2)}(\sin\theta_{dc1} + \sin\theta_{dc2}) \\ B_{idc11\_y} = \dfrac{\mu_0 l_x}{4\pi(l_x^2 + l_{y1}^2)}(\sin\theta_{dc1} + \sin\theta_{dc2}) \end{cases} \quad (41)$$

In other words, the magnetic flux densities at the angle detector 4 generated by the DC currents flowing through the path 40g, the path 40h, the path 40e, and the path 40f are given by Expression (42).

$$\begin{cases} B_{idc\_x} = 0 \\ B_{idc\_y} = \dfrac{\mu_0 I_{dc} l_x}{2\pi}(\sin\theta_{dc1} + \sin\theta_{dc2})\left(\dfrac{1}{l_x^2 + l_{y1}^2} - \dfrac{1}{l_x^2 + l_{y2}^2}\right) \end{cases} \quad (42)$$

The DC current component correction signals h sin1 and h cos1 are given by Expression (43) in this state.

$$\begin{cases} h_{cos1} = \dfrac{B_{a0}}{2}\sin 2\theta_m \\ h_{sin1} = \dfrac{B_{a0}}{2}\{1 + \cos 2\theta_m\} \end{cases} \quad (43)$$

Each of the DC current component correction signals h sin1 and h cos1 is calculated by adding two terms (that is, four terms in total) in Expression (25). However, h cos1 can be expressed by one term in Expression (43), and thus the DC current component correction signals h sin1 and h cos1 can be calculated through use of the terms, the number of which is reduced to three. Therefore, when the main path from the DC power supply to the first inverter and the main path from the DC power supply to the second inverter are symmetrical about the XZ plane of the angle detector, and the main path from the first inverter to the DC power supply and the main path from the second inverter to the DC power supply are symmetrical about the XZ plane of the angle detector, there can be provided such an unprecedented effect that the processing load imposed by the angle calculation having the high update frequency can be reduced.

The main paths are arranged symmetrically about the XZ plane in this case, but the same effect can be provided also when the main paths are arranged symmetrically about the YZ plane.

Sixth Embodiment

In a six embodiment of the present invention, a description is given of a case in which the arrangement of the path through which the multi-phase AC currents flow with respect to the angle detector 4 is different from that in the first embodiment. For the sake of description, it is assumed that the number of pole pairs of the AC rotary machine 1 is 5, the shaft angle multiplier of the angle detector 4 is 1, and an X-axis direction of the angle detector 4 and a direction (zero point position) of 0 deg of the mechanical angle of the AC rotary machine match each other. The same applies to a case in which the number of pole pairs, the shaft angle multiplier, and the zero point position are different.

Figure 11:
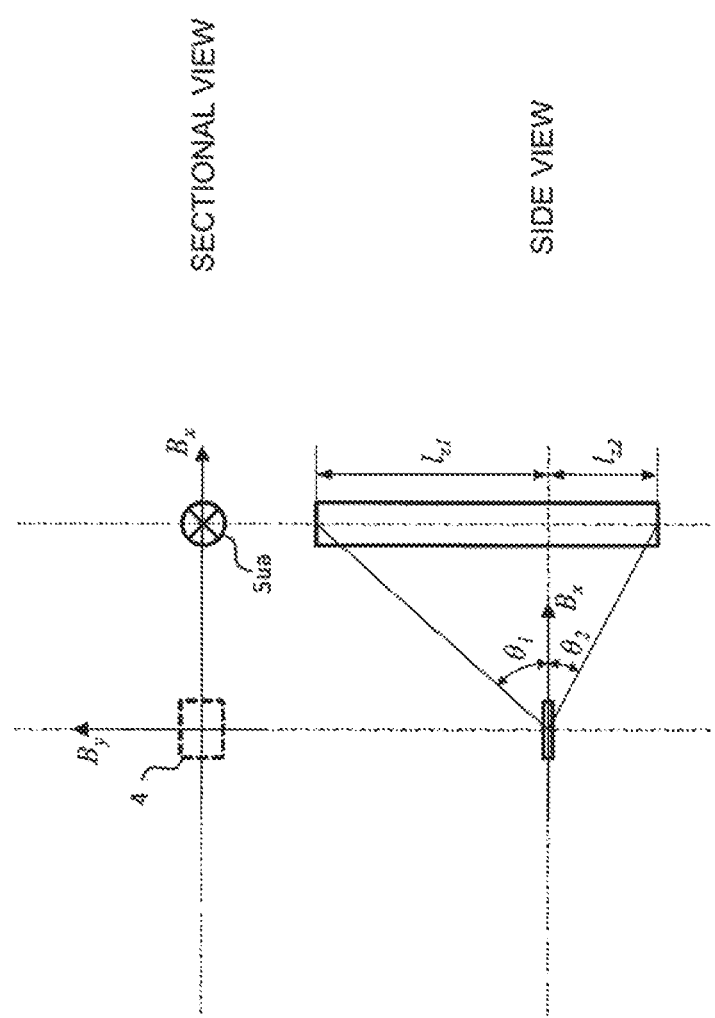
FIG. 11 is a diagram for illustrating a positional relationship between a path through which the U-phase current flows and the angle detector according to a sixth embodiment of the present invention.

FIG. 11 is a diagram for illustrating a positional relationship between the path 5ua through which the U-phase current flows and the angle detector 4 according to the sixth embodiment of the present invention. In FIG. 11, a top part is a sectional view, and a bottom part is a side view. FIG. 11 corresponds to a case in which θu of FIG. 3 is 0 deg. A magnetic flux density at the angle detector 4 generated by the U-phase current is given by Expression (44) in this state.

$$\begin{cases} B_{iu\_x} = 0 \\ B_{iu\_y} = \dfrac{\mu_0 I_u}{4\pi r_u}(\sin\theta_1 + \sin\theta_2)\cos\theta_u \\ \phantom{B_{iu\_y}} = K_{uy}I_u \end{cases} \quad (44)$$

A path 5va through which the V-phase current flows and a path 5wa through which the W-phase current flows, which are not shown, are arranged on straight lines parallel with the Z axis on the XZ plane similarly to the path ua. When the noise magnetic flux does not exist, and the magnitude of the magnetic flux at the angle detector 4 is Bmg, an X-axis component and a Y-axis component of the noise magnetic flux due to the three-phase currents are given by Expression (45).

$$\begin{cases} B_{iuvw\_x} = 0 \\ B_{iuvw\_y} = \sqrt{2}\, I_{rms}\left\{K_{uy}\sin\left(\theta_e + \theta_\beta + \dfrac{\pi}{2}\right) + K_{vy}\sin\left(\theta_e + \theta_\beta - \dfrac{\pi}{6}\right) + K_{wy}\sin\left(\theta_e + \theta_\beta - \dfrac{5}{6}\pi\right)\right\} \\ \phantom{B_{iuvw\_y}} = B_{mg}\{B_{c5}\cos(5\theta + \theta_\gamma) + B_{d5}\sin(5\theta_m + \theta_\gamma)\} \end{cases} \quad (45)$$

The paths of the currents are the lines parallel with the Z axis in this case, but it is to be understood that the paths are not limited to this direction as long as the paths are on the XZ plane or on the XY plane, and the same approach can be applied to a single or a plurality of straight lines on the same plane, or a three-dimensional curve. The noise magnetic flux in the X-axis direction can be reduced to zero by arranging the paths through which the currents flow on the XZ plane or the YZ plane. In this case, the AC current component correction signals h sin2 and h cos2 are given by Expression (46).

$$\begin{cases} h_{cos2} = -\frac{B_{d5}}{4}\cos(3\theta_m + \theta_\gamma) + \frac{B_{c5}}{4}\sin(3\theta_m + \theta_\gamma) + \frac{B_{d5}}{4}\cos(7\theta_m + \theta_\gamma) - \frac{B_{c5}}{4}\sin(7\theta_m + \theta_\gamma) \\ = \cos\theta_m\{-\cos(4\theta_m + \theta_\gamma + \gamma_{s5}) + \cos(6\theta_m + \theta_\gamma + \gamma_{s5})\} \\ = -\sqrt{B_{c5}^2 + B_{d5}^2}\sin\theta_m\cos\theta_m\sin(5\theta_m + \theta_\gamma + \gamma_{s5}) \\ h_{sin2} = \frac{B_{c5}}{4}\cos(3\theta_m + \theta_\gamma) + \frac{B_{d5}}{4}\sin(3\theta_m + \theta_\gamma) \\ +\frac{B_{c5}}{2}\cos(5\theta_m + \theta_\gamma) + \frac{B_{d5}}{2}\sin(5\theta_m + \theta_\gamma) + \frac{B_{c5}}{4}\cos(7\theta_m + \theta_\gamma) + \frac{B_{d5}}{4}\sin(7\theta_m + \theta_\gamma) \\ = \sqrt{B_{c5}^2 + B_{d5}^2}\cos^2\theta_m\sin(5\theta_m + \theta_\gamma + \gamma_{s5}) \end{cases} \quad (46)$$

When Expression (46) is used, terms of 4th order and 6th order are not required to be individually calculated, and the AC current component correction signals h sin2 and h cos2 can be calculated through use of a sine of 1st order, a cosine of 1st order, and a sine of 5th order.

When the arrangement of FIG. 3 is employed, the sines of 3rd order, the sines of 5th order, and the sines of 7th order in the two types of phases (namely, six sines) are required to be calculated in the AC current component correction signals h sin2 and h cos2 given by Expression (25). In contrast, when the arrangement of FIG. 11 is employed, the AC current component correction signals can be calculated by calculating the sine of 1st order, the cosine of 1st order, and the sine of 5th order (namely, a total of three of the sines and cosine) as given by Expression (46). Thus, the number of references to the table can be reduced by employing the method in the sixth embodiment, to thereby be able to reduce the processing load imposed by the angle calculation having the high update frequency.

In other words, the AC current component correction signals can be calculated from the sine and cosine of 1st order and the sine of nth order by setting the direction of the noise magnetic flux of nth order rotation caused by the multi-phase AC currents to the X-axis direction or the Y-axis direction. As a result, there can be provided such an unprecedented effect that the processing load imposed by the angle calculation having the high update frequency can be reduced.

A control device for electric power steering may be constructed by employing the control device for an AC rotary machine according to any one of the first to six embodiments, to thereby generate a torque for assisting a steering torque.

An output torque generated by the control device for electric power steering is transmitted to a steering wheel shaft through gears, a chain, or the like. It is not rare that a torque controller in the control device for electric power steering uses the number of rotations as an input in order to secure stability when torque feedback is executed in this state.

When an angle error of nth order rotation exists, the detected number of rotations also includes an error of nth order rotation. Therefore, current commands obtained through the torque controller contain ripples of nth order rotation, which causes a sense of discomfort given to the user through the steering wheel.

Moreover, in order to increase the output after a nominal number of rotations is reached, the control device for electric power steering often uses the magnetic field weakening control of causing a negative d-axis current to flow, to thereby suppress a decrease in the q-axis current due to voltage saturation. A gain from the angle error to the q-axis current ripple is large within a range in which the larger d-axis current is caused to flow. Therefore, noise or torque ripples of nth order rotation is caused at the time of high rotation, which causes a sense of discomfort given to the user.

Regarding this problem, the torque ripples and the noise caused by the angle error at the time of current supply can be suppressed by employing the control device for an AC rotary machine according to any one of the first to sixth embodiments to construct a control device for electric power steering. As a result, there can be provided an unprecedented effect of implementing the control device for electric power steering capable of reducing the sense of discomfort given to the user.

REFERENCE SIGNS LIST

1 AC rotary machine, 2 inverter, 3 magnetic flux generator, 4 angle detector, 8 control arithmetic unit, 10 DC power supply, 11 smoothing capacitor, 20 correction signal calculation unit, 21 angle calculation unit, 22 current control unit, 30 DC current correction signal calculation unit, 31 AC current correction signal calculation unit

The invention claimed is:
1. A control device for an AC rotary machine, comprising:
a DC power supply;
an inverter, which is configured to invert a DC voltage supplied from the DC power supply to AC voltages, and to apply the AC voltages to armature windings of the AC rotary machine;
a magnetic flux generator configured to rotate in synchronization with a rotor of the AC rotary machine configured to be rotated by a rotating magnetic flux formed by multi-phase AC currents flowing through the armature windings, to thereby generate an angle detection magnetic flux for detecting a rotation angle of the AC rotary machine;
an angle detector, which is used in a saturated state with respect to a main component direction of the angle detection magnetic flux, and is configured to detect a cosine signal and a sine signal, which are two compo- nents orthogonal to each other and form the angle detection magnetic flux; and a control calculator configured to control the inverter based on a current command directed to the AC rotary machine and angle information obtained from the cosine signal and the sine signal, wherein the control calculator is configured to:

calculate, based on a positional relationship between a current path and the angle detector, a correction signal for correcting signal errors of the cosine signal and the sine signal, which are caused by a noise magnetic flux component due to at least one of a DC current flowing between the DC power supply and the inverter or the multi-phase AC currents flowing between the inverter and the armature windings; and control the inverter by using the angle information obtained from a corrected cosine signal and a corrected sine signal, which are values after the correction by the correction signal.

2. The control device for an AC rotary machine according to claim 1, wherein the control calculator comprises:

a correction signal calculator configured to use the correction signal so as to correct a signal error proportional to a noise magnetic flux component in a normal line direction of the angle detection magnetic flux out of the noise magnetic flux due to at least one of the DC current or the multi-phase AC currents, to thereby generate the corrected cosine signal and the corrected sine signal;

an angle calculator configured to generate the angle information as a corrected rotation angle based on the corrected cosine signal and the corrected sine signal; and a current controller configured to control the inverter based on the corrected rotation angle.

3. The control device for an AC rotary machine according to claim 2, wherein, when a number of pole pairs of the magnetic flux generator is m (m is a natural number), a signal error caused by a noise magnetic flux of 0th order rotation due to the DC current contains a 0th order rotation component and a 2mth order rotation component, and wherein the correction signal calculator is configured to use the correction signal corresponding to the noise magnetic flux due to the DC current, a phase and an amplitude of which are determined by a phase correction constant and an amplitude correction constant determined by an arrangement of the angle detector, to thereby generate the corrected cosine signal and the corrected sine signal.

4. The control device for an AC rotary machine according to claim 3, wherein the angle detector is arranged at such an installation position that a direction of a magnetic flux generated by the DC current at a position of the angle detector on an XY plane is an X-axis direction or a Y-axis direction of the angle detector, and wherein the correction signal calculator is configured to calculate the correction signal corresponding to the noise magnetic flux caused by the DC current under satisfaction of a condition that the angle detector is arranged at the installation position.

5. The control device for an AC rotary machine according to claim 4, wherein a main path of the DC current from the DC power supply to the inverter and a main path of the DC current from the inverter to the DC power supply are arranged so as to be symmetrical about an XZ plane or a YZ plane of the angle detector.

6. The control device for an AC rotary machine according to claim 4, wherein the inverter includes a first inverter and a second inverter, wherein a main path of the DC current from the DC power supply to the first inverter and a main path of the DC current from the DC power supply to the second inverter are arranged so as to be symmetrical about an XZ plane or a YZ plane of the angle detector, and wherein a main path from the first inverter to the DC power supply and a main path from the second inverter to the DC power supply are arranged so as to be symmetrical about the XZ plane or the YZ plane.

7. The control device for an AC rotary machine according to claim 4, wherein the inverter includes at least one of a first inverter or a second inverter, wherein a main path of the DC current from the DC power supply to the first inverter and a main path of the DC current from the second inverter to the DC power supply are arranged so as to be symmetrical about an XZ plane or a YZ plane of the angle detector, and wherein a main path from the DC power supply to the second inverter and a main path from the first inverter to the DC power supply are arranged so as to be symmetrical about the XZ plane or the YZ plane.

8. The control device for an AC rotary machine according to claim 2, further comprising a smoothing capacitor connected in parallel to the DC power supply between the DC power supply and the inverter, wherein the correction signal calculator is configured to calculate, based on an arrangement of the angle detector and the current path through which the DC current flows, the correction signal corresponding to the noise magnetic flux due to the DC current, a phase and an amplitude of which are determined by a phase correction constant and a amplitude correction constant.

9. The control device for an AC rotary machine according to claim 2, wherein, when a number of pole pairs of the AC rotary machine is n (n is a natural number), a signal error caused by a noise magnetic flux of nth order rotation due to the multi-phase AC currents contains at least one of a (n−2m)th order rotation component or a (n+2m)th order rotation component in addition to a nth order rotation component, and wherein the correction signal calculator is configured to calculate the correction signal corresponding to the noise magnetic flux due to the multi-phase AC currents, a phase and an amplitude of which are determined by the phase correction constant and the amplitude correction constant determined by the current path of the multi-phase AC currents flowing between the inverter and the armature windings and an arrangement of the angle detector.

10. The control device for an AC rotary machine according to claim 9, wherein the angle detector is arranged at such an installation position that amplitudes of and a phase difference between an X-axis component and a Y-axis component of a magnetic flux generated by the multi-phase AC currents at a position of the angle detector are the same and $\pi/2$, respectively, and wherein the correction signal calculator is configured to calculate the correction signal corresponding to the noise magnetic flux due to the multi-phase AC currents under satisfaction of a condition that the angle detector is arranged at the installation position.

11. The control device for an AC rotary machine according to claim 9,
wherein the angle detector is arranged at such an installation position that a direction of a magnetic flux generated by the multi-phase AC currents at a position of the angle detector on an XY plane is an X-axis direction or a Y-axis direction of the angle detector, and
wherein the correction signal calculator is configured to calculate the correction signal corresponding to the noise magnetic flux due to the multi-phase AC currents under satisfaction of a condition that the angle detector is arranged at the installation position.

12. A control device for electric power steering, comprising, the control device for an AC rotary machine of claim 1, wherein the control device for an AC rotary machine is configured to execute torque control of generating a torque for assisting a steering torque of electric power steering.

* * * * *